Figure 2A:
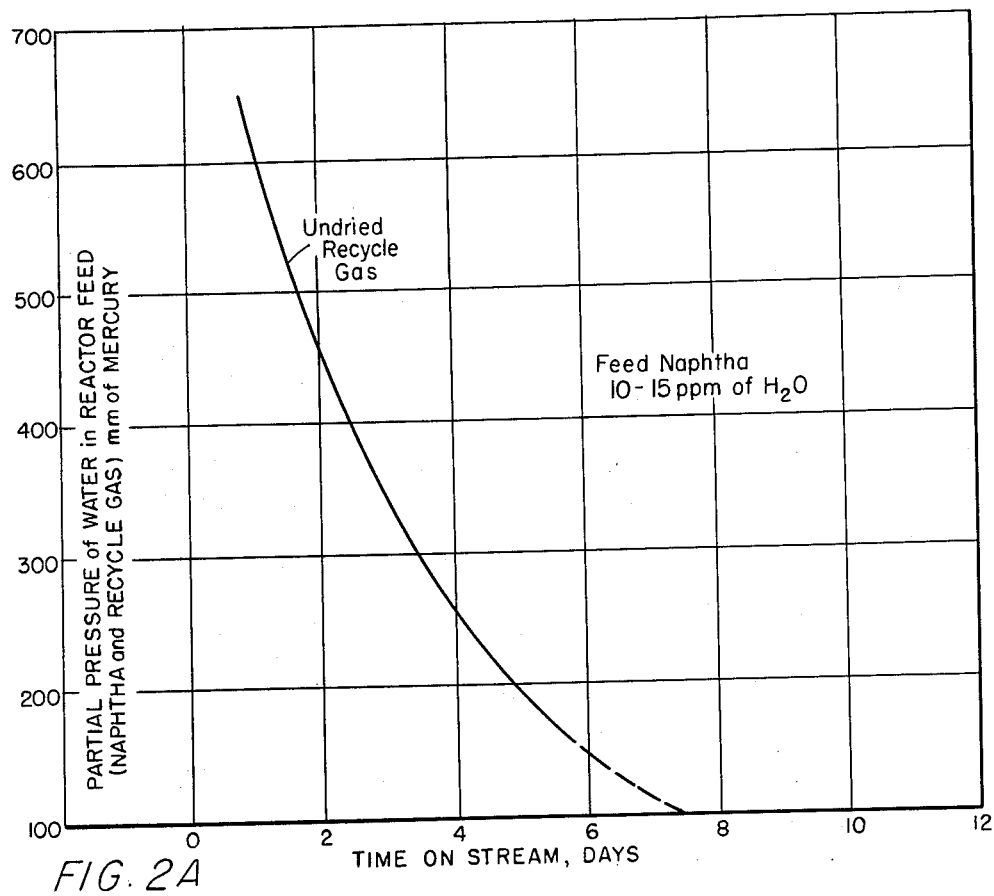

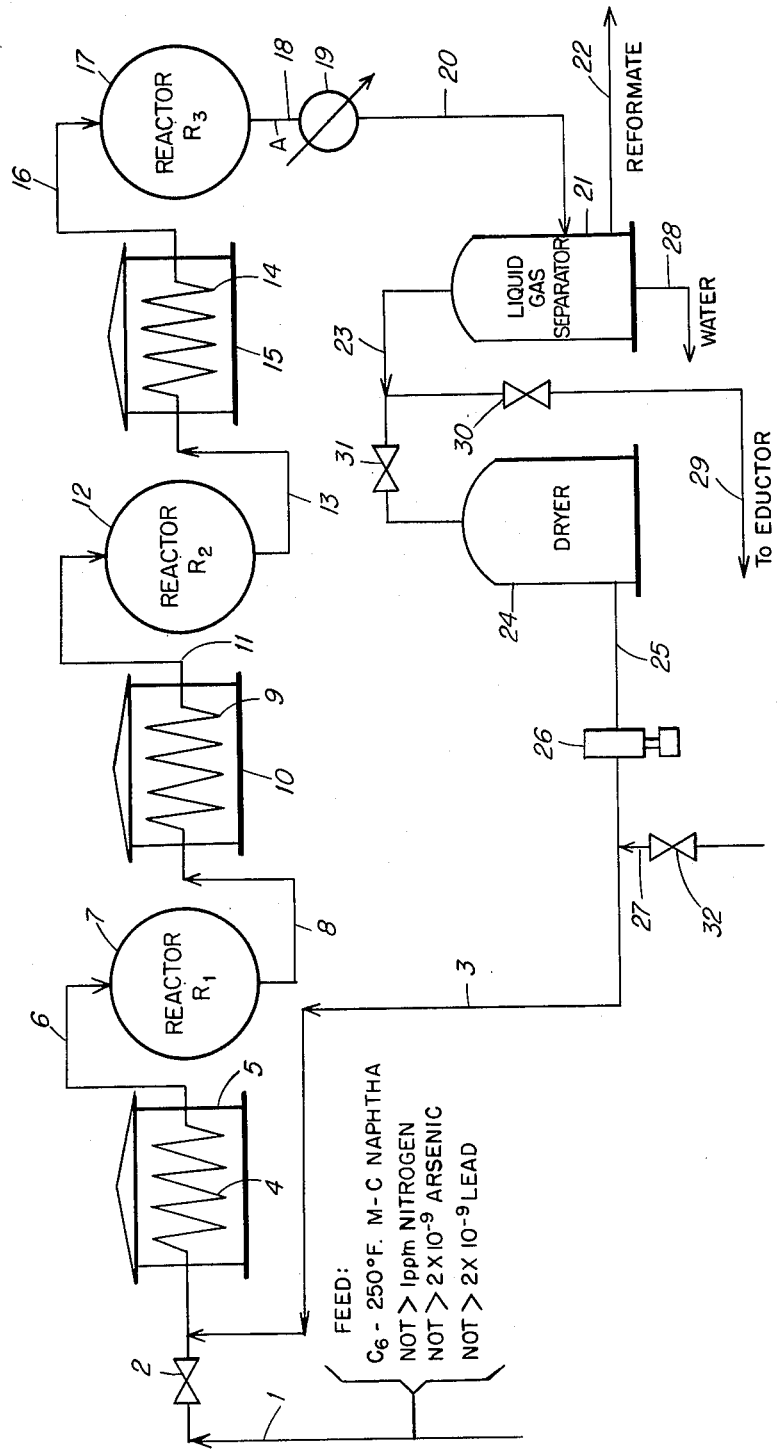

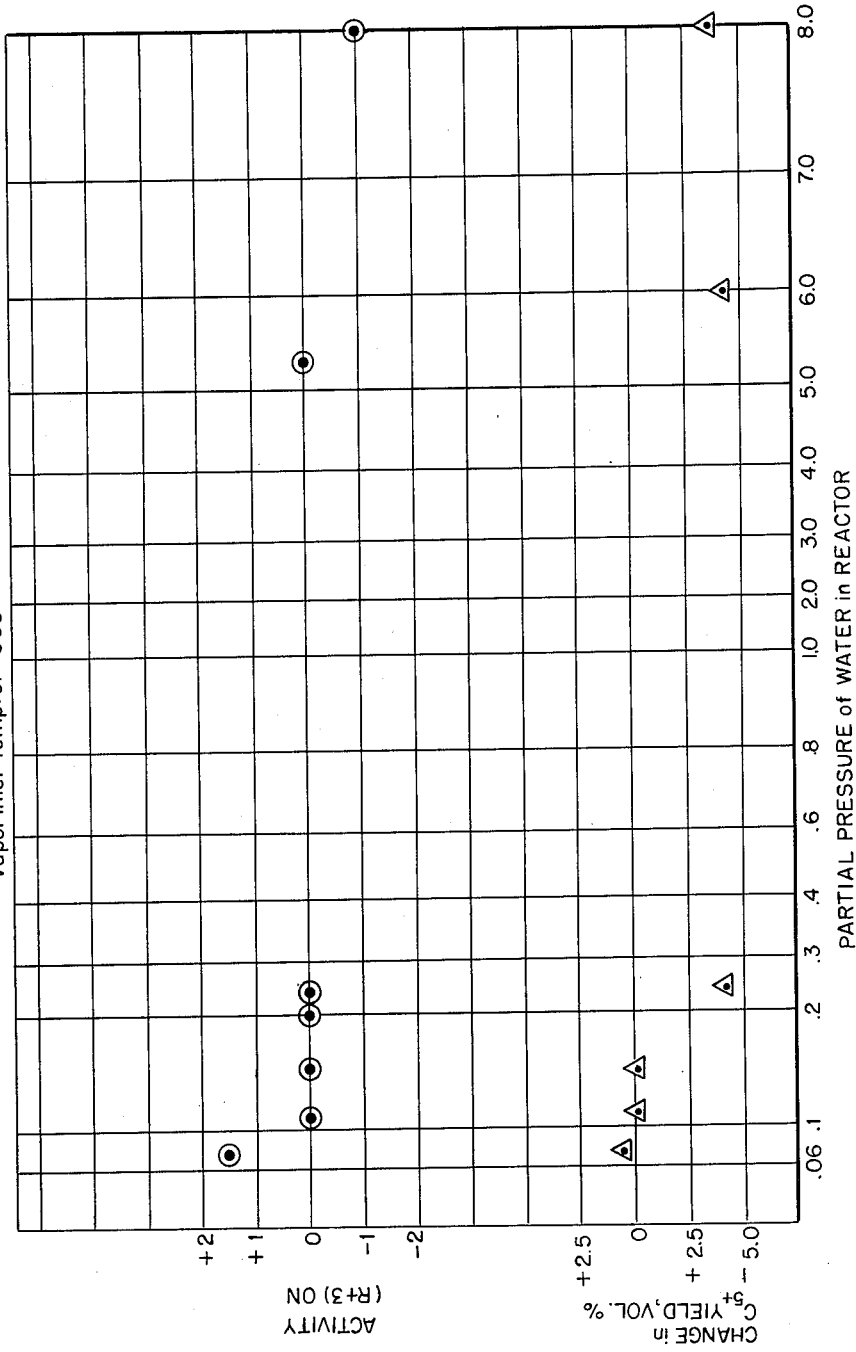

United States Patent Office 3,234,120
Patented Feb. 8, 1966

3,234,120
MAINTAINING CATALYST SURFACE AREA IN DESICCATED REFORMING
Leon M. Capsuto, Woodbury, N.J., assignor to Socony Mobil Oil Company, Inc., a corporation of New York
Filed May 15, 1964, Ser. No. 367,775
15 Claims. (Cl. 208—138)

This application is a continuation of my application, Ser. No. 45,827, filed July 28, 1960, now abandoned.

The present invention relates to the reforming of hydrocarbons, particularly a mixture of hydrocarbons boiling in the boiling range of gasoline, and more particularly to the reforming of hydrocarbons boiling in the boiling range of gasoline at pressures of not more than 400 pounds per square inch gauge (p.s.i.g.) and preferably of about 200 p.s.i.g. The present invention is also concerned with the pretreatment of virgin or used particle-form solid platinum-group metal reforming catalyst prior to contacting the reforming catalyst with hydrocarbon to be reformed. By application of the principles of the present invention desiccated reforming of the $C_6$ to 250° F. fraction of Mid-Continent naphtha has been carried on at 200 p.s.i.g. to produce 10 R.V.P. leaded (R+3 cc. TEL) gasoline having an octane rating of 109 to 111 for on-stream periods of ninety-three days.

Desiccated reforming as used herein is the characterization of a reforming operation in which the partial pressure of water vapor in the effluent of the reforming unit does not exceed about 0.4 millimeter (mm.) of mercury and preferably the partial pressure of water vapor in the effluent of the reforming unit is within the range of about 0.05 to about 0.2 millimeter of mercury.

There have been many discussions of the effect of the moisture content of recycle gas upon the activity, selectivity, and yield of reformate produced by contact of naphtha with platinum metal reforming catalyst. Thus, for example, in U.S. Patent No. 2,772,217 the patentees teach that reforming catalysts comprising oxides or sulfides of metals of Groups IV, V, VI, VII, and VIII after regeneration contain about 0.2 to 1.0 percent water by weight. The patentees recommend that the regenerated catalyst be dried to a moisture content of about 0.1 to 0.8 percent by weight in a stripping zone. The moisture content of the gas entering the aforesaid stripping zone preferably is maintained above 0.5 mol percent and below about 5 mol percent, preferably about 2–3 mol percent. However, the moisture of the catalyst entering the reactor is not the sole source of moisture in the reactor. The information given in this patent indicates that 0.5 percent of water by weight based on the catalyst is equivalent to 0.6 mol percent water in the reaction zone. The catalyst loses about 0.3 percent of water by weight in the reactor. The partial pressure of water in the reactor is further increased by small amounts of water in the recycle gas and in the feed naptha. Consequently, the partial pressure of water in the reactor described in U.S. Patent 2,772,217 is in excess of about 40 mm. of Hg at 200 p.s.i.g. and 7.5 mm. Hg at 25 p.s.i.g.

The description of the reforming method given in U.S. Patent No. 2,842,482 is of a reforming process in which the recycle gas contains 0.5 percent by volume of water. This water alone will contribute a partial pressure of water vapor of 10 mm. of Hg at a total reactor pressure of 54 p.s.i.g. and 44 mm. of Hg at a total reactor pressure of 200 p.s.i.g.

However, desiccated reforming is reforming in which the moisture content of the effluent of the tail reaction zone expressed as partial pressure of water at 200 p.s.i.g. total pressure is less than 0.4 mm. of Hg and preferably about 0.05 to 0.2 mm. of Hg.

There are three sources of water in the reforming reaction zone. The charge naphtha usually contains up to about 10–15 parts per million (p.p.m.) of water. A concentration of 15 p.p.m. water in the charge naphtha contributes only about 0.08 mm. of Hg to the total partial pressure of water in the reaction zone at a total reaction zone pressure of 200 p.s.i.g. An undried recycle gas will build this up to 0.5–2.0 mm. Hg partial pressure. While this amount of water in the reaction zone vapors does not adversely affect the activity of platinum-group metal reforming catalyst it does produce a lower yield of $C_{5+}$ reformate by volume from a $C_5$ to 250° F. E.P. feed than when the partial pressure in the final effluent of the reforming reaction zone is within the range of 0.05 to 0.2 mm. Hg. The data presented in Table I illustrates the effect of the moisture in the recycle gas upon the yield of $C_{5+}$ reformate when the charge naphtha contains 10–15 p.p.m. by weight of water.

TABLE I

Feed: $C_5$ to 270° F. fraction of Mid-Continent naphtha.
Reaction zone pressure _____p.s.i.g__  175
Hydrogen-to-naphtha mol ratio _____ 4.5:1
Liquid hourly space velocity _____v./hr./v__   1.0
Severity: Octane No. (Research +3 cc. TEL) ____  104
Catalyst: 0.6 weight percent platinum, 0.7 weight percent chlorine on alumina support.

| Run | 1 | 2 | 3 | 4 |
|---|---|---|---|---|
| Water in feed naphtha, p.p.m. by weight | 10–15 | 10–15 | 10–15 | 10–15 |
| Partial pressure of water in reaction zone effluent, mm. Hg | | 0.26–0.31 | 0.11–0.16 | 0.12–0.17 |
| Increased yield of $C_{5+}$ reformate, percent base | | 1 | 3 | 3 |
| On-stream time, days | 50 | 45 | 63 | 50 |

It will be observed that the foregoing data establish that by reducing the moisture content of the reaction zone vapors as measured in the final effluent thereof about 35 percent $$\frac{(26-17\%)}{26}$$

to about 61 percent $$\frac{(31-12\%)}{31}$$

from 26 to 31 mm. Hg to 12 to 17 mm. Hg, the yield of $C_{5+}$ reformate having an octane rating (Research+3 cc. TEL) of 104 from a $C_5$ to 270° F. E.P. feed is increased about two percent. (An increased yield of two percent in the 104 octane (Research+3 cc. TEL) $C_{5+}$ reformate in a unit reforming 10,000 barrels per day is about 240,000 dollars per 300 days (on-stream year) increased revenue.)

The moisture content of the recycle gas also adversely affects the yield when producing $C_{5+}$ reformate having a leaded (Research+3 cc. TEL) octane rating of 109 to 111 from a $C_5$ to 250° F. E.P. feed even though the moisture content of the feed is only 15 p.p.m. by weight and the catalyst is dried at 900–1000° F. to about 1.2 percent by weight water in excess of that held by the catalyst when dried at 1250° C. (2282° F.). That is to say, when the recycle gas is not dried while introducing feed naptha containing 15 p.p.m. of water about six days are required for the system to come to equilibrium. On the other hand, when the recycle gas is dried and the catalyst is dried to less than 1.1% by weight water in excess of that held by catalyst at 1250° C. the system comes to equilibrium in about 1.5 days. However, although the system reaches equilibrium in about six days when the recycle gas is not dried, the yield of $C_{5+}$ reformate continues to be about one percent by volume less than the yield when the recycle gas and catalyst are dried so that the water in the charge naphtha plus the water in the recycle gas provides a partial pressure of water in the final effluent of the reforming reaction zone not in excess of 0.2 mm. Hg. The curves in FIGURES 2A and 2B graphically illustrate these facts.

Figure 2B:
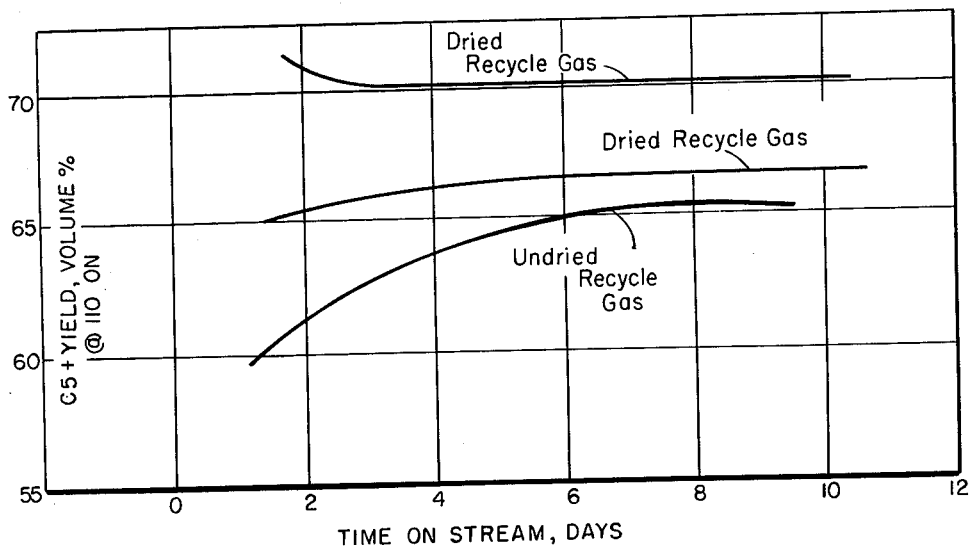
Figure 3A:
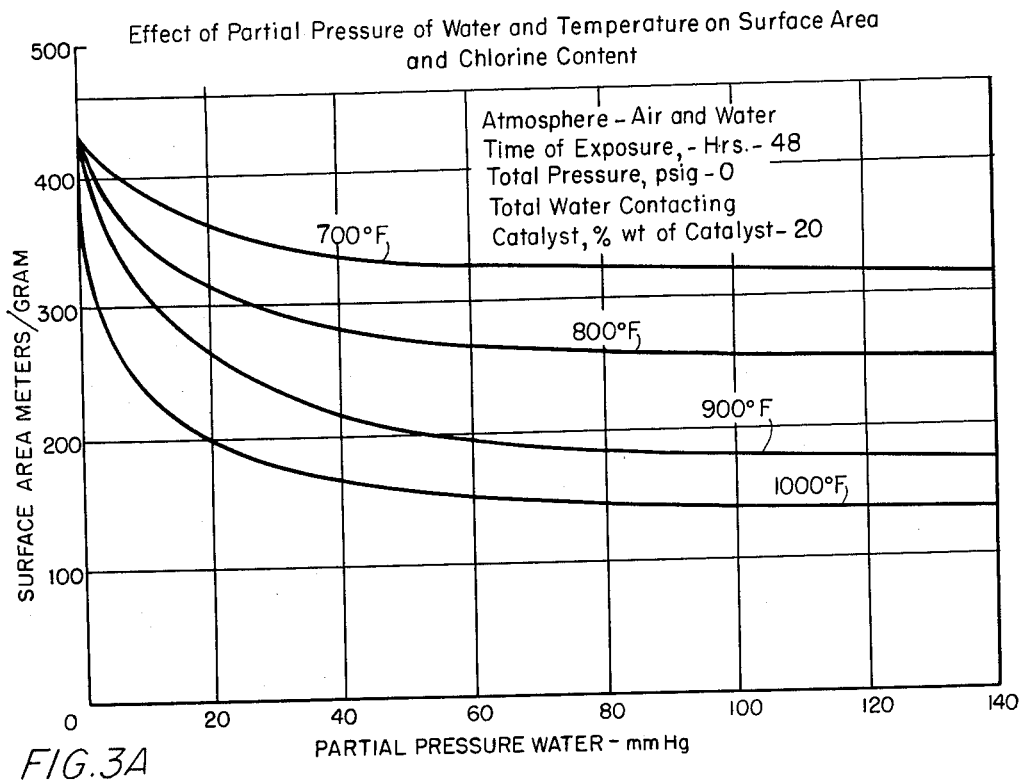
Figure 3B:
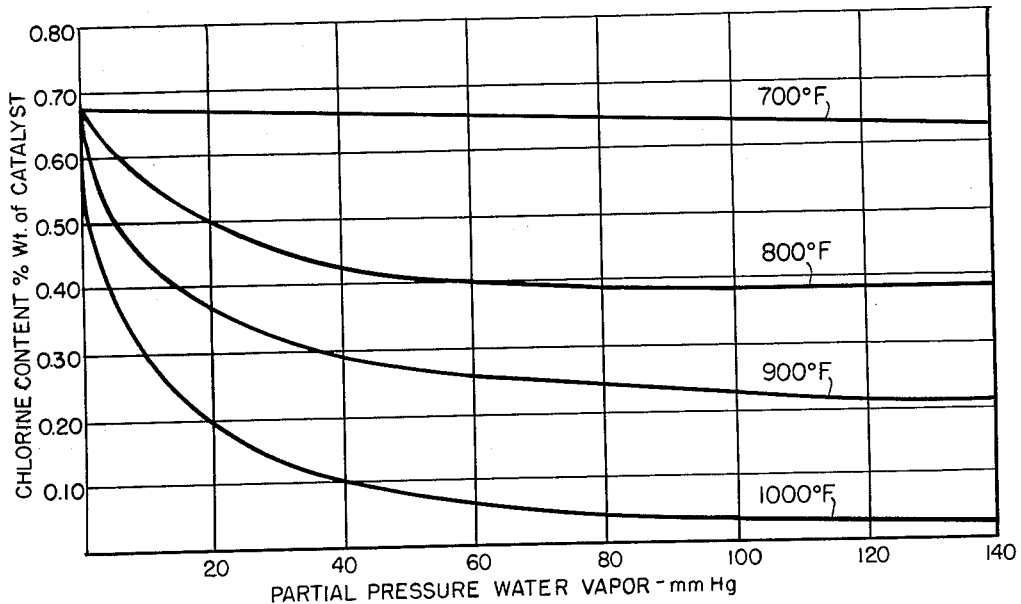

The curves in FIGURES 2A and 2B represent the data obtained when producing $C_{5+}$ reformate having a leaded octane rating of 110 from the $C_6$ to 250° F. fraction of Mid-Continent naphtha under the reforming conditions set forth in Table II.

gas with which the catalyst is in contact and the temperature thereof. The chlorine content of the catalyst is also affected by the moisture content of the gas with which the catalyst is in contact and the temperature thereof. This is graphically illustrated by the curves in FIGURES 3A and 3B.

Fresh platinum-metal group reforming catalyst comprising 0.6 percent by weight platinum and 0.67 percent by weight chlorine was contacted with air containing water in the amounts indicated at a total pressure of 0 p.s.i.g. for forty-eight hours at the temperatures designated on the curves. The total amount of water with which the catalyst was in contact during each test was the same and amounted to twenty percent by weight of the catalyst. It will be observed that even at 700° F. the surface area of the catalyst is reduced about fifteen percent when the partial pressure of the water in the gas contacting the catalyst is 20 mm. Hg. However, the surface area of the catalyst is reduced only about twelve percent more when the moisture content of the gas contacting the catalyst is increased 600 percent to 140 mm. Hg. At 700° F. the chlorine content of the catalyst is reduced only a negligible amount by contact with gas containing water at 140 mm. Hg partial pressure. On the other hand, the surface area of a catalyst initially having a surface area of 430 square meters per gram is reduced to less than 200 square meters at 900° F. by contact with gas having a partial pressure of water of 60 mm. Hg and at 1000° F. by contact with gas having a partial pressure of water of 20 mm. Hg.

TABLE III

*Comparison of properties of commercially available platinum reforming catalysts*

| Catalyst | Standard | A | B | C |
|---|---|---|---|---|
| Platinum, weight percent | 0.6 | 0.72 | 0.53 | 0.78. |
| Chlorine, weight percent | 0.7 | 0.42 | 0.01 | 0.89. |
| Fluorine, weight percent | 0.0 | 0.34 | 0.0 | 0.0. |
| Base | Alumina | Alumina | Silica-Alumina[1] | Alumina. |
| Alumina type | Eta | Gamma | Eta | Gamma. |
| Surface area, $M.^2/gm$ | 420 | 157 | 132 | 200. |
| Crushing strength, lb | | | | |
| Platinum crystallite size: | | | | |
| Angstroms | 23 | 17 | | 20/75. |
| Percent | 100 | 100 | | 50/50. |
| Reforming activity | Standard | +20° F.[3] | +5° F. | Standard. |
| Selectivity | do | Standard | (²) | Do. |
| Dehydrogenation activity | 100 | 125 | 83 | 100. |

[1] 55.1% $Al_2O_3$, 43.9% $SiO_2$.
[2] Less 10 R.V.P. gasoline than standard; $C_{5+}$ dry gas, and $H_2$ yields higher than standard; $C_4$ yield greater than standard.
[3] +=increased reaction temperature=lower activity.

TABLE II

*Catalyst: 0.6% by weight platinum, 0.7% by weight chlorine, alumina support*

| Run | Undried | Dried |
|---|---|---|
| Recycle gas driers | No | Yes |
| Catalyst treatment | (¹) | (²) |
| Catalyst water content at start of run, percent weight in excess of weight of catalyst calcined at 1250° C | 1.15–1.25 | <1.1 |
| Reaction zone pressure, p.s.i.g | 200 | 200 |
| Vapor inlet temp., °F | 960 | 960 |
| Liquid hourly space velocity | 0.8 | 0.8 |
| $H_2$/HC, mol ratio | 7/1 | 7/1 |
| Liquid-gas separator temp., °F | 70–85 | 70–85 |

[1] 2 hrs. at 450° F. in contact with 1 s.c.f. $H_2$/hr. plus 2 hrs. at 950° F. in contact with 1 s.c.f. $H_2$/hr. ($H_2O$ in $H_2$=0.5–1 p.p.m. by volume).
[2] 2 hrs. at 450° F. in contact with 1 s.c.f. $H_2$/hr. plus 2 hrs. at 950° F. in contact with 1 s.c.f. $H_2$/hr. plus 3 hrs. at 960° F. in contact with 10 s.c.f. $H_2$/hr. ($H_2O$ in $H_2$=0.5–1 p.p.m. by volume).

The moisture content of the catalyst also plays an important part in the partial pressure of water in the final effluent of the reaction zone. The surface area of the alumina support is affected by the moisture content of the All commercially available platinum-group metal reforming catalysts do not initially have the same surface area. However, the loss in surface area of a catalyst is indicative of its stability for use as a reforming catalyst. In addition, surface area is one of the most readily measured of the important characteristics of platinum-group metal reforming catalysts. A comparison of the properties of four commercially available platinum reforming catalysts is provided in Table III.

It will be observed that the surface areas of these commercially available catalysts range from about 130 square meters per gram to 420 square meters per gram. It will also be observed that the size of the platinum crystallites varies from 100 percent 17 to 23 Angstroms (A.) to fifty percent 20 Angstroms and fifty percent 75 Angstroms. It will also be noted that reforming activity and selectivity are equal for catalysts having surface areas of 200 and 420 square meters per gram. In contrast the catalyst containing a total of about 0.76 percent by weight halogen but a surface area of only 157 square meters per gram requires a vapor inlet temperature about 20° F. higher than that required with the standard catalyst to produce reformate having the same leaded octane rating. This is indicative of lower activity. On the other hand, where the acid sites of the catalyst are produced by silica, the halogen content is negligible and the surface area is only about 132 square meters per gram the catalyst requires a vapor inlet temperature about 5° F. higher than that required with the standard catalyst. However, less 10 R.V.P. gasoline is produced with the silica-alumina base catalyst, while the yields of $C_4$, $C_{5+}$, dry gas, and hydrogen are higher than produced with the standard catalyst.

One of the most readily measured characteristics of commercially available catalysts after aging for various intervals in commercial reforming units is surface area. Two platinum-metal reforming catalysts were aged in three different commercial reforming units operating at different severities. Samples were examined after various intervals of from five to thirty-six months. The effect of commercial operation on various properties of the catalysts were determined. The results for catalyst "D" are presented in Table IV and for catalyst "E" in Table V.

readily measured, and is one of the most important measurable characteristics of the catalyst, pretreatment of the catalyst to provide a catalyst with maximum surface area when initially contacted with the naphtha feed is of paramount importance.

Figure 5A:
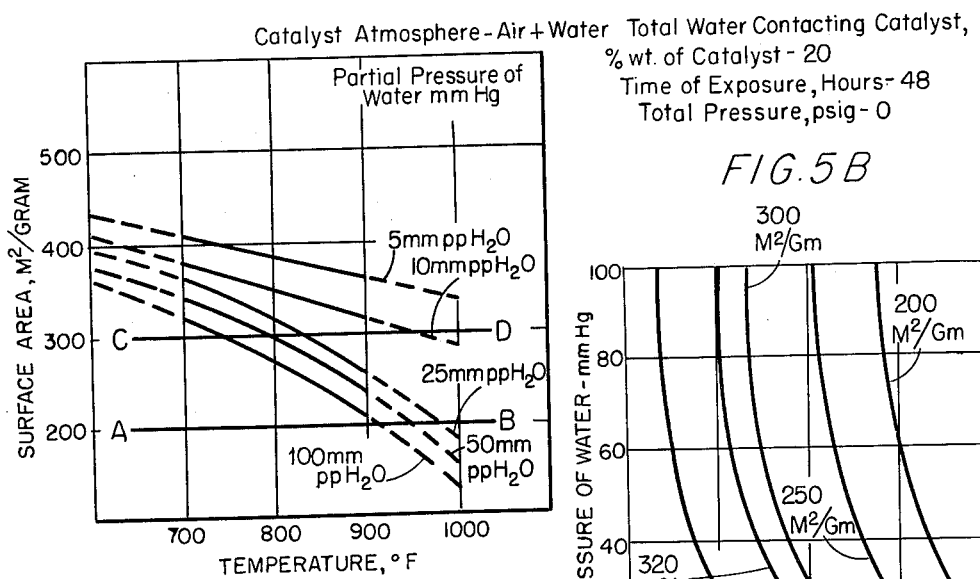
Figure 5B:
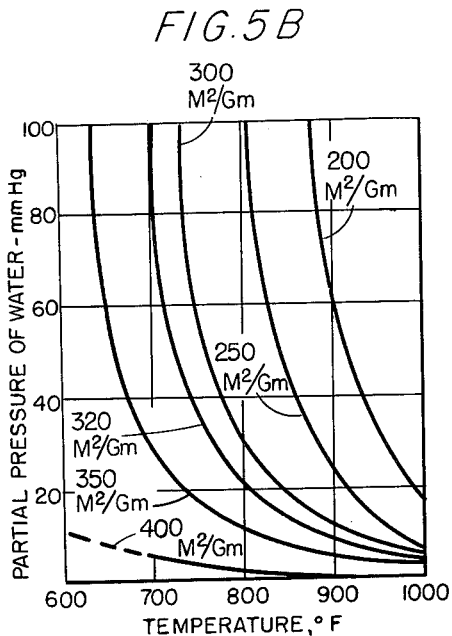

The surface area of a platinum-group metal reforming catalyst is very sensitive to the effect of water in its environment and to the temperature of that environment as is graphically illustrated in FIGURES 5A and 5B.

In FIGURE 5A the change in surface area with increased temperature from 700° F. to 1000° F. when the gas with which the catalyst is in contact contains various amounts of water measured as the partial pressure of water vapor is graphically illustrated. The catalyst treated was a platinum-group metal reforming catalyst comprising 0.6 percent by weight of platinum and 0.7 percent by weight of chlorine on an alumina support.

In FIGURE 5B interdependent conditions of the water content of the catalyst environment and temperature at which the surface area of the catalyst remains constant are graphically illustrated.

TABLE IV

*Effect of aging in commercial units upon surface area, crystallite size, dehydrogenation activity and reforming activity at 500 p.s.i.g.*

| Refinery Catalyst | D | 1 D | 2 D | 2 D | 3 D | 1 D | 3 D | 3 D |
|---|---|---|---|---|---|---|---|---|
| Age, months | Fresh | 5 | 5 | 12 | 13 | 19 | 20 | 36 |
| Reforming severity O.N. (R+3 cc.) | | 101–102 | 93–99 | 90–91 | 97–100 | 101–102 | 97–101 | 97–101 |
| Pt, weight percent | 0.6 | 0.6 | 0.6 | 0.6 | 0.6 | 0.6 | 0.6 | 0.6 |
| Cl, weight percent | 0.67 | 0.25 | 0.36 | 0.68 | 0.41 | 0.10 | 0.18 | 0.20 |
| Surface area m.²/gm | 454 | 178 | | 177 | | 127 | 163 | 129 |
| Pt crystallite size: | | | | | | | | |
| Angstroms | 22 | 23/142 | | | 23 | 20/125 | 27 | 26 |
| Percent | 100 | 80/20 | | | 100 | 80/20 | 100 | 100 |
| D.A.[1] | 100 | 80 | 68 | | | | | |
| R.A.[2] ° F | 910 | 931 | 917 | 913 | 918 | 954 | 919 | |
| Crushing strength, lb | 10.1 | 2.7 | | | 5.9 | 1.5 | 2.6 | 2.2 |
| Yields[3] | | Normal | [4] Yield loss | Normal | Normal | | Normal | |

[1] Relative to dehydrogenation activity for fresh catalyst.
[2] Vapor inlet temperature to reform standard Mid-Continent naphtha to 98 O.N. (R+3 cc.) at 500 p.s.i.g., 2 LHSV, 10:1 hydrogen: naphtha mol ratio.
[3] Normal selectivity compared to fresh catalyst.
[4] Losses in $C_{5+}$ reformate from 2% by volume at 97 O.N. (R+3) to 12% by volume at 103 O.N. (R+3).

TABLE V

| Refinery Catalyst | E | 1 E | 2 E | 2 E | 3 E | 1 E | 3 E | 3 E |
|---|---|---|---|---|---|---|---|---|
| Age, months | Fresh | 5 | 5 | 12 | 13 | 19 | 20 | 36 |
| Reforming severity, O.N. (R+3) | | 101–102 | 93–99 | 90–91 | 97–100 | 101–102 | 97–101 | 97–101 |
| Pt, weight percent | 0.35 | 0.35 | 0.35 | 0.35 | 0.35 | 0.35 | 0.35 | 0.35 |
| Cl, weight percent | 0.43 | 0.26 | 0.98 | | 0.65 | 0.41 | 0.10 | 0.20 | 0.25 |
| Surface area, m.²/gm | 420 | 176 | | 168 | 176 | 129 | 167 | 134 |
| Pt crystallite size: | | | | | | | | |
| Angstroms | 22 | 22/120 | | | 23 | 20/113 | 25 | 24 |
| Percent | 100 | 95/5 | | | 100 | 85/15 | 100 | 100 |
| D.A.[1] | 95 | | 61 | | | 79 | | |
| R.A.[2] ° F | 922 | 927 | 904 | 916 | 918 | 974 | 919 | |
| Crushing strength, lb | 7.0 | 2.6 | | | 4.0 | 1.4 | 1.8 | 1.6 |
| Yields[3] | Normal | Normal | Normal | Normal | Normal | Normal | Normal | Normal |

[1] Relative to dehydrogenation activity for fresh catalyst.
[2] Vapor inlet temperature to reform standard Mid-Continent naphtha to 98 O.N. (R+3 cc.) at 500 p.s.i.g., 2 LHSV, 10:1 hydrogen: naphtha mol ratio.
[3] Normal selectivity compared to fresh catalyst.

Figure 4:
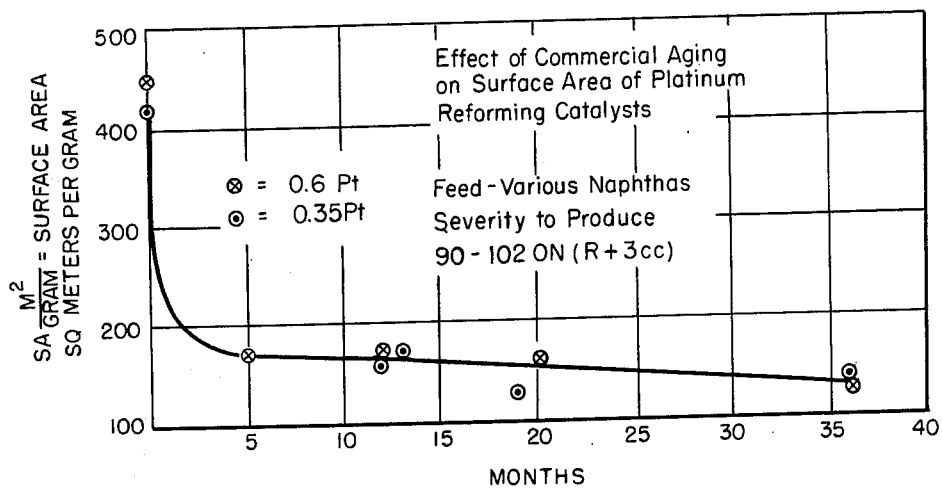

The effect of this commercial aging is graphically presented in FIGURE 4. It will be observed that the loss in surface area for both catalysts is such as to justify only one curve for the values for both catalysts. It is also to be noted that both catalysts lost about 54 percent of the surface area in five months.

Since the surface area of the catalyst is the property of the catalyst which suffers the largest change, is most Inspection of FIGURE 5A establishes that when the partial pressure of water is 5 mm. Hg the loss in surface area at temperatures from 700° F. to 900° F. is from about 3.6 percent to 14.5 percent. On the other hand when the partial pressure of water in the gas or atmosphere surrounding the catalyst is 100 mm. Hg the loss in surface area is from about 23.4 to about 50.6 percent. These values are given in Table VI.

TABLE VI

| Temp., °F. | Surface area m.²/gm. | Loss in surface area m.²/gm. | Percent loss in surface area |
|---|---|---|---|
| PARTIAL PRESSURE OF WATER, MM. HG: 5 | | | |
| 700 | 415 | | |
| 700 | 400 | 15 | 3.6 |
| 800 | 380 | 35 | 8.4 |
| 900 | 355 | 60 | 14.5 |
| PARTIAL PRESSURE OF WATER, MM. HG: 10 | | | |
| 700 | 415 | | |
| 700 | 380 | 35 | 8.4 |
| 800 | 350 | 65 | 15.7 |
| 900 | 315 | 100 | 24.1 |
| PARTIAL PRESSURE OF WATER, MM. HG: 25 | | | |
| 700 | 415 | | |
| 700 | 355 | 60 | 14.5 |
| 800 | 305 | 110 | 26.5 |
| 900 | 250 | 165 | 39.8 |
| PARTIAL PRESSURE OF WATER, MM. HG: 50 | | | |
| 700 | 415 | | |
| 700 | 335 | 80 | 19.3 |
| 800 | 280 | 135 | 32.5 |
| 900 | 212 | 203 | 48.9 |
| PARTIAL PRESSURE OF WATER, MM. HG: 100 | | | |
| 700 | 415 | | |
| 700 | 318 | 97 | 23.4 |
| 800 | 260 | 155 | 37.4 |
| 900 | 205 | 210 | 50.6 |

FIGURE 5B on the other hand graphically shows that to avoid loss in surface area the moisture content of the catalyst environment or atmosphere must be correlated with the temperature of the environment. Thus, a catalyst which has a surface area of 400 square meters per gram (m.²/gm.) cannot be exposed to an atmosphere in which the partial pressure of water is in excess of 5 mm. Hg at temperatures of 700° F. and greater. On the other hand, a catalyst which has a surface area of 200 m.²/gm. can be exposed to an atmosphere in which the partial pressure of water is in excess of 100 mm. Hg at temperatures of the order of 875° to 1000° F. without loss in surface area. This knowledge is important to the conditioning of catalyst whether virgin or used.

As shown in Tables IV and V the surface area of platinum-group metal reforming catalyst having initially a surface area of about 450 m.²/gm. was reduced to about 178 m.²/gm. in five months. In the succeeding thirty-one months the surface area was only reduced about 46 m.²/gm. Consequently, it is of greatest importance to have the surface area of the catalyst initially as high as concomitant with normal yield so that the loss in surface area will not reduce the surface area to a commercially impractical value in too short a period of time on stream. Accordingly, for use especially in reforming at low pressures of not in excess of 400 p.s.i.g., it is presently preferred to employ a platinum-group metal catalyst having a surface area of at least 200 m.²/gm. and preferably having a surface area of at least 300 m.²/gm. In FIGURE 5A line A-B is indicative of the minimum surface area presently required for acceptable performance of a platinum-group metal reforming catalyst, employed in low pressure reforming, i.e., a surface area of at least 200 m.²/gm. Line C-D in FIGURE 5A graphically sets the minimum surface area presently preferred for a platinum-group metal reforming used in low pressure, i.e., not exceeding 400 p.s.i.g. and preferably about 50 to 250 p.s.i.g., reforming.

Figure 5C:
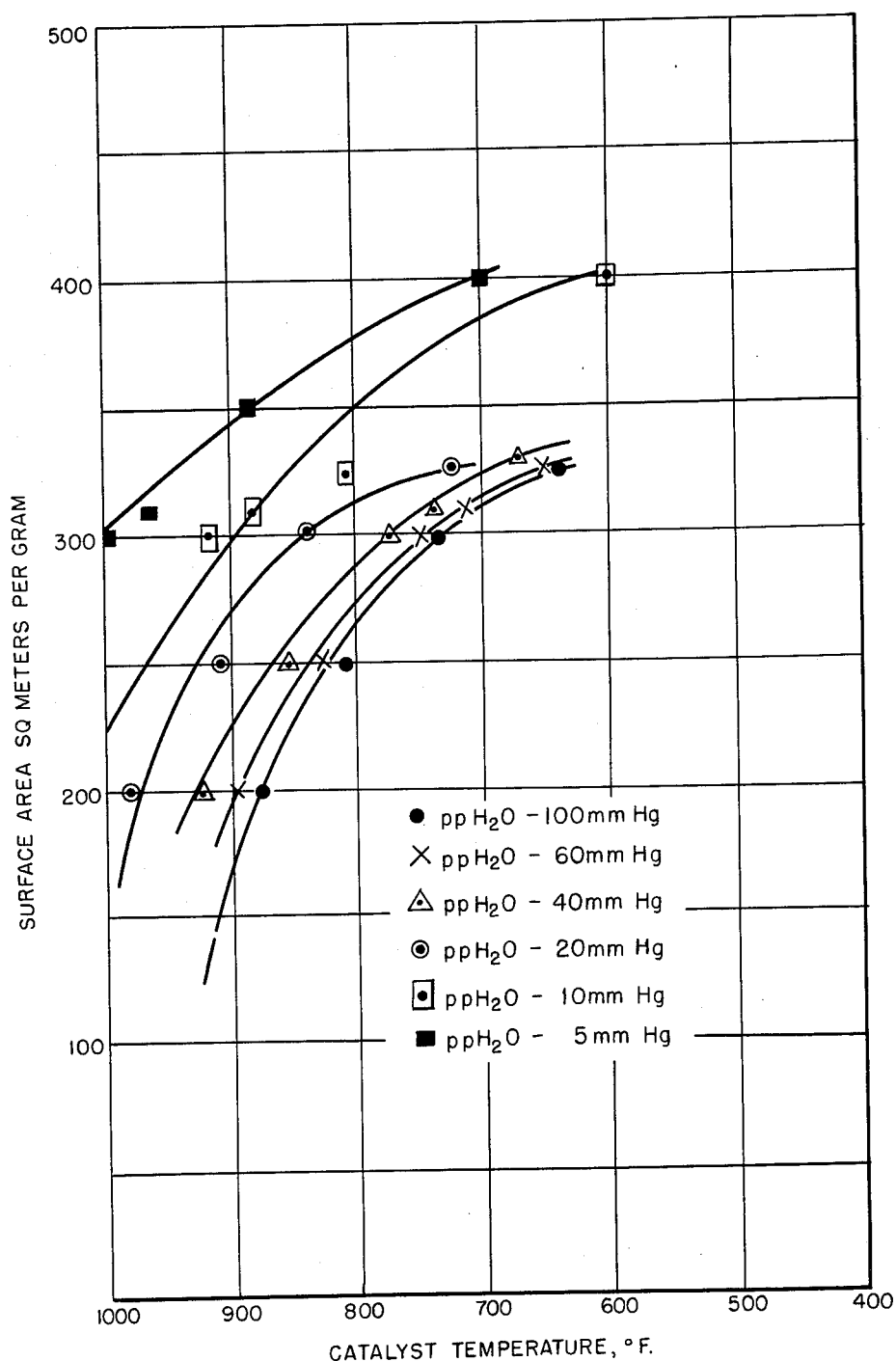

The data presented in FIGURES 5A and 5B has been further summarized in FIGURE 5C. The curves in FIGURE 5C indicate the temperatures at which platinum-group metal reforming catalysts having various surfaces can be heated in the presence of gas having the indicated partial pressure of water (mm. Hg) without substantially reducing the surface area of the catalyst. Those having surface areas of 350 m.²/gm. or less can be heated at temperatures from about 650° F. to about 870° F. in the presence of gas having a partial pressure of water of 100 mm. Hg without a substantial loss of surface area. On the other hand, catalyst having a surface area in excess of 350 m.²/gm. can be heated to temperatures within the range of about 600° F. to 1000° F. only in the presence of gas having a partial pressure of water not in excess of 10 mm. Hg without substantial loss of surface area.

The effect of the partial pressure of water in the feed to a reaction zone when operating to produce a product having an octane rating (R+3 cc.) of 109–112 from the $C_6$ to 250° F. fraction of Mid-Continent naphtha is graphically illustrated in FIGURE 6. It will be observed that while the activity of the platinum-group metal catalyst is reduced about 1.5 octane numbers when the partial pressure of water in the feed, i.e., naphtha plus hydrogen-containing gas, to the reaction zone is increased from 0.075 mm. Hg to 0.115 mm. Hg thereafter the activity of the catalyst (as measured by the octane rating of the product produced at the same vapor inlet temperature) remains about the same until the partial pressure of water in the feed exceeds 5.7 mm. Hg. However, while the activity of the catalyst remains substantially the same the yield is reduced about four percent when the partial pressure of water in the feed, i.e., naphtha plus recycle gas, is increased from 0.155 mm. Hg to 0.25 mm. Hg. A loss of four percent in yield is a loss of 600,000 dollars per year in a reforming unit producing 111 octane leaded (R+3 cc. TEL) gasoline from 10,000 barrels of naphtha per day. Consequently, while a partial pressure of water in excess of 0.17 mm. Hg in the feed to a low pressure reforming unit has an immeasurable effect upon the activity of the catalyst the loss in yield is measurable and of industrial importance. Accordingly, it is an object of the present invention to provide a method of reforming naphtha, especially a fraction of naphtha having an end point not exceeding 300° F. and particularly a fraction of naphtha having an end point not exceeding about 250° F. in which the partial pressure of water vapor in the vaporous contents of the reforming reaction zone does not exceed 0.5 mm. Hg and preferably within the range of not in excess of 0.17 mm. Hg as measured in the final effluent, i.e., in the effluent of the last or tail reaction zone.

Since there are three sources from which water is introduced into the reaction zone it follows that the total amount of water introduced from the three sources should not exceed 0.5 mm. Hg and preferably 0.2 mm. Hg. Consequently, the degree to which the moisture content of any of the naphtha feed, the recycle gas, and the catalyst is reduced grossly is dependent upon the moisture content of the other two. Thus, for example, it is relatively easy commercially to dry naphtha to a moisture content of 10 to 15 p.p.m. (parts per million) by weight of water. This amount of water in the feed of a 10,000 barrels per day (417 barrels per hour) 200 p.s.i.g. reforming unit when the hydrogen-to-naphtha mol ratio is 7:1 will provide a partial pressure of water of about 0.5 to 2.0 mm. Hg in the reaction zone. Hence, the naphtha feed preferably is dried to less than 10 p.p.m. by weight of water. The recycle gas generally is dried not to exceed about 5 p.p.m. by volume of water. The catalyst having originally a surface area of 300 to 400 or more square meters per gram (m.²/gm.) is conditioned to provide a surface area of at least 200 m.²/gm. and preferably at least 300 m.²/gm.

At this juncture the definitions of a few terms used hereinafter and in the claims are given.

An "unconditioned" catalyst is a virgin or regenerated particle-form solid platinum-group metal reforming catalyst having a moisture content such that when contacted in a container at 950° F. with gas, i.e., air, or hydrogen, or hydrogen-containing gas consisting essentially of at least 90 percent by volume hydrogen and the balance $C_1$ to $C_4$ hydrocarbons, or nitrogen, having a partial pressure of water of about less than 0.1 mm. Hg at the rate of about 4,200 to about 8,500 s.c.f. of gas/hour/barrel of catalyst the partial pressure of water in the aforesaid gas is increased to more than 3–6 mm. Hg as measured at the vapor outlet of said container.

A "conditioned" catalyst is a virgin or regenerated particle-form solid platinum-group metal reforming catalyst having a moisture content such that when contacted in a container at 950° F. with gas, as defined hereinbefore, having a partial pressure of water of less than 0.1 mm. Hg at the rate of about 4,200 to about 8,500 s.c.f. of gas/hour/barrel of catalyst, the partial pressure of water in the gas as measured at the vapor outlet of said container is increased to less than about 3–6 mm. Hg.

A "conditioned" catalyst is also defined as a virgin or regenerated particle-form solid platinum-group metal reforming catalyst having a moisture content not more than 1.1 percent by weight greater than the moisture content of the catalyst before "conditioning" after ignition at 1250° C. for 48 hours.

"Conditioning" is the operation of contacting a particle-form solid platinum-group metal reforming catalyst with a dehydrating gas at dehydrating temperature wherein the temperature of the dehydrating gas, as defined hereinafter, is regulated in accordance with the partial pressure of water as measured at the vapor outlet of the reaction zone and with the surface area of the aforesaid catalyst prior to conditioning to produce a "conditioned" catalyst as defined hereinbefore.

A "reaction zone" comprises one or more containers each containing a static bed of catalyst with at least one inlet for vaporous and gaseous reactant, and a vapor outlet. The vapor outlet of a reaction zone at which the partial pressure of water is measured when said reaction zone is established in a plurality of containers comprising at least a head reactor and a tail reactor is the vapor outlet of the aforesaid tail reactor.

A "dehydrating gas" is gas with which "unconditioned" catalyst, as defined hereinbefore, is contacted to dehydrate or desiccate said "unconditioned" catalyst to produce "conditioned" catalyst. A "dehydrating gas" is nitrogen, flue gas containing not more than fifty percent by volume oxides of carbon, hydrogen, hydrogen-containing gas such as recycle gas comprising hydrogen and $C_1$ to $C_4$ hydrocarbons, and air.

A charge naphtha containing "innocuous amounts" of sulfur, nitrogen, arsenic, and lead is a charge naphtha containing an amount of sulfur insufficient to appreciably reduce the activity of the platinum-group metal reforming catalyst and insufficient to corrode unduly the ferrous metal with which it is in contact, containing not more than 1 p.p.m. by weight of nitrogen and being substantially free of arsenic and lead. Substantially free of arsenic and lead designates a concentration of arsenic and/or lead in a reformer feed which, when said reformer feed is contacted with a static bed of particle-form solid platinum-group metal reforming catalyst comprising about 0.35 percent by weight of platinum, is insufficient to deactivate said catalyst within the life of the catalyst, for example, two years, as determined by other factors such as the temperature required to produce a reformate having an octane rating of at least 100 (Research+3 cc. TEL), the yield of reformate, and the mechanical strength of the catalyst.

Platinum-group metal reforming catalyst acts as a desiccant and can absorb up to eight percent by weight of water at atmospheric temperature, humidity, and pressure.

Figure 7A:
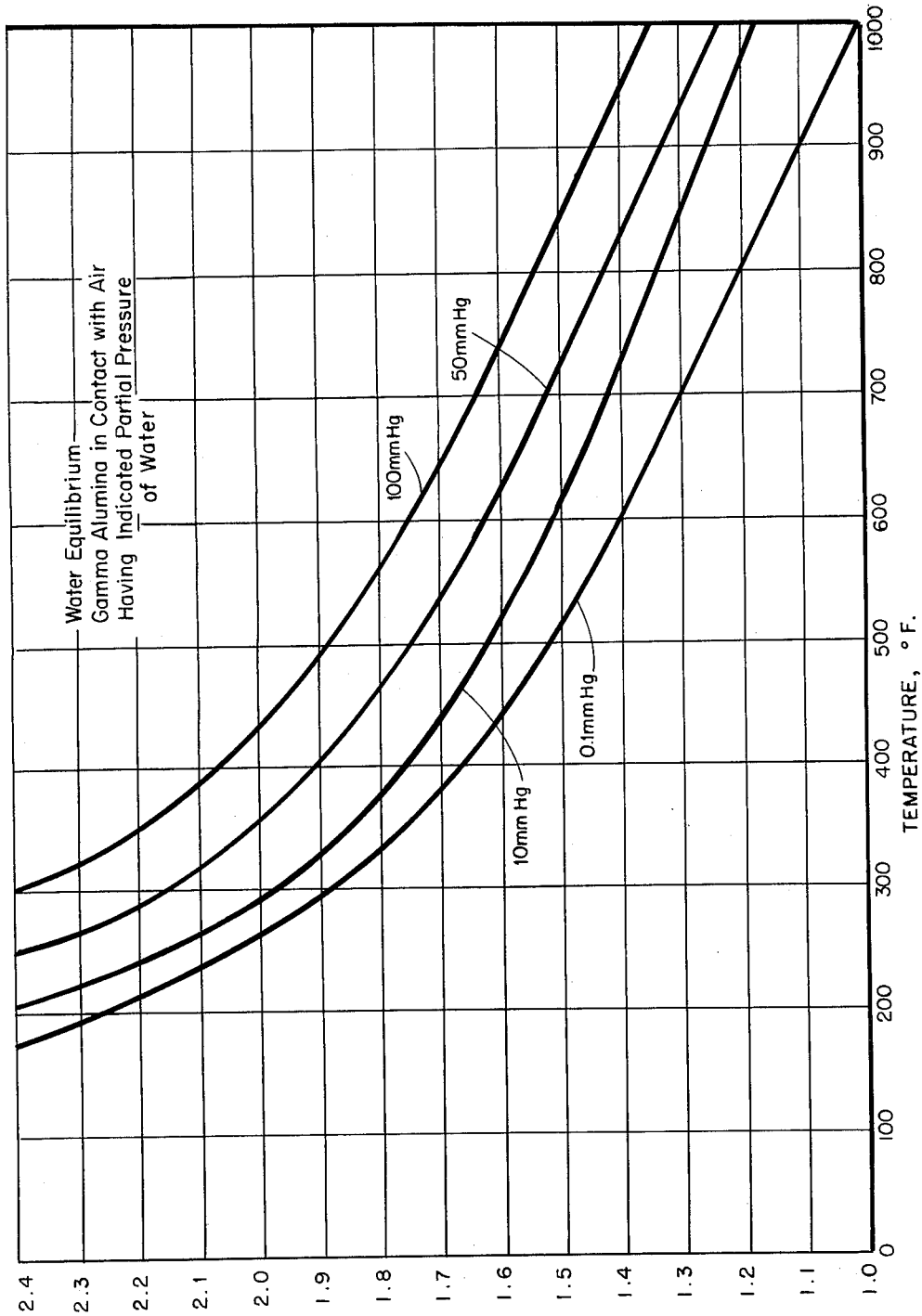
Figure 7B:
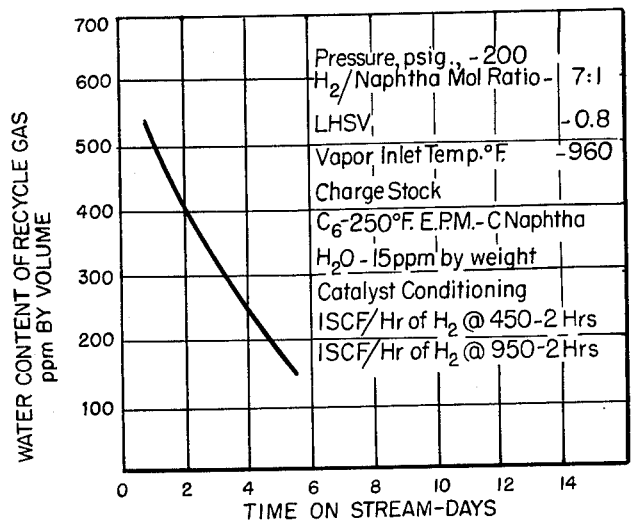
Figure 7C:
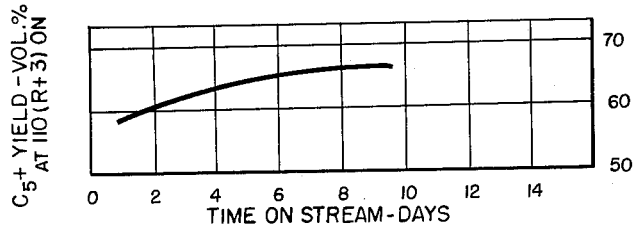

The support of the platinum-group metal reforming catalyst is the portion of the catalyst which acts as a desiccant. Since the support of many particle-form solid platinum-group metal reforming catalysts is essentially alumina, the characteristics of gamma alumina are indicative of the capabilities of platinum-group metal catalyst to absorb water from and to release water to the environment. It is recognized that, when comparing the moisture content of alumina before and after any given treatment, the standard conditions under which the control alumina was dried must be stated for the comparison to be meaningful. Accordingly, the moisture content of alumina which has been heated at 1250° C. in dry air to constant weight is used as a basis of comparison. The amount of water in excess of that present in a sample of alumina ignited at 1250° C. in dry air is designated reversible water. The curves in FIGURE 7 indicate the amount of reversible water absorbed by alumina in contact with air having the indicated partial pressure of water at the indicated temperatures. Accordingly, it is presently preferred to condition a particle-form solid platinum-group metal reforming catalyst having a refractory oxide desiccant base until the moisture of the conditioned catalyst is at such a level that when used to reform naphtha containing not more than 13 p.p.m. by weight of water in the presence of recycle gas containing not more than 5 p.p.m. by volume of water, i.e., partial pressure less than 0.6 mm. Hg, the effluent gas from the reaction zone has a partial pressure of water not in excess of about 0.5 mm. Hg. Presently, it is preferred to condition a particle-form solid platinum-group metal reforming catalyst having a base comprising alumina until the aforesaid catalyst has a moisture content not more than about 1.1 percent by weight greater than the moisture content of the aforesaid catalyst when ignited at 125° C. In other words, the reversible water content of the conditioned catalyst does not exceed 1.1 percent by weight.

Some of this water absorbed after the preparation of the catalyst during handling in and out of the shipping containers undoubtedly is removed in the conventional start-up procedure of a reforming unit, i.e., during the purging with inert gas to remove air, purging with hydrogen to remove the inert gas and heating the catalyst to reforming reaction temperature. However, an appreciable amount of water is retained by the catalyst unless a special effort is made to remove the last portion. The water remaining on the catalyst is given off after the unit goes on-stream as is evidenced by the moisture content of the recycle gas. (See FIGURES 2A and 2B.) After several days on-stream the water on the catalyst equilibrates with the water in the catalyst environment and the water content of the recycle gas drops to a level dependent upon the moisture content of the feed naphtha and the temperature of the liquid-gas separator in which the separation of the recycle gas from the $C_4$ and heavier reformate is made. The moisture content of saturated recycle gas separated at 70° F. at various pressures is given in Table VII.

TABLE VII

| Pressure, p.s.i.g.: | Water content of saturated gas @ 70° F., p.p.m. by volume [1] |
|---|---|
| 0 | 24,700 |
| 100 | 3,165 |
| 200 | 1,690 |
| 500 | 706 |

[1] Vapor pressure=18.8 mm. Hg.

The water content of the gas increases as it passes through the bed of catalyst. Therefore, the partial pressure of water in the gas in contact with the catalyst in the bottom of the bed can be higher than 18.8 mm. Hg the vapor pressure of water at 70° F. The data presented graphically in FIGURES 2A and 2B clearly indicate that gas containing these amounts of water can have an adverse effect upon the catalyst. On the other hand, in gas containing 1 p.p.m. of water by volume the partial pressures of the water at various total pressures are given in Table VIII.

TABLE VIII

| Pressure, p.s.i.g.: | Partial pressure of water vapor in gas containing 1 p.p.m. by volume of water, mm. Hg. |
|---|---|
| 0 | $7.60 \times 10^{-4}$ |
| 100 | $5.95 \times 10^{-3}$ |
| 200 | $1.11 \times 10^{-2}$ |
| 500 | $2.70 \times 10^{-2}$ |

The data presented in Table IX clearly establish that control of the moisture of the gas entering the bed of catalyst protects the first section of the bed of catalyst. However, the water that the gas removes from the first section of the bed of catalyst will damage each subsequent section of the bed of catalyst through which pass the gas and water stripped from the preceding sections of catalyst. Therefore, for protection of the entire bed of catalyst the moisture content of the gas leaving the bed of catalyst must be controlled.

That is to say, the water content of the gas passing through the bottom section of a catalyst bed is equal to the sum of the water in the gas entering the bed of catalyst and the water stripped from the preceding sections of the bed of catalyst by the gas.

hand, when the temperature of the catalyst was raised relatively slowly in the presence of an "infinite" volume of gas the surface area of the catalyst in the bottom of the reactor was only reduced about 17 percent and only 3 to 7 percent more than the surface areas of the catalyst in the top and middle sections respectively of the reactor. Thus, it is manifest that the water removed from the catalyst in one section of the reactor has an adverse effect upon catalyst subsequently contacted with the gas containing the stripped water when the temperature of the catalyst in the subsequently contacted portion of the bed is of the order of 950° F.

The foregoing conclusions are fortified by the data presented in Table X.

TABLE X

| No. | Catalyst treatment | Average force to crush, lbs. | |
|---|---|---|---|
| 1 | Fresh | 9.13± | 1.11 |
| 2 | Fresh, dried 2 hours at 240° F | 8.41± | 0.72 |
| 3 | Fresh, dried 2 hours at 900° F | 7.28± | 0.69 |
| 4 | Fresh, heated at 4° F./minute to 900° F., dried 2 hrs. at 900° F., cooled in open furnace, all in its own atmosphere. | 3.49± | 0.18 |
| 5 | Fresh, same as No. 4, except dried air passed over the catalyst at 2 space velocity until drying completed. | 9.88± | 0.49 |
| 6 | Fresh, same as No. 5 except hydrogen used instead of dried air. | 10.13± | 0.51 |
| 7 | Used but not regenerated after 276 days producing leaded gasoline having octane rating of 104; 25 barrels of naphtha/pound of catalyst. | About one-half of the value for fresh catalyst. | |
| 8 | Used but not regenerated after 1 day on-stream producing leaded gasoline having octane rating of 98; 0.2 barrel of naphtha/pound of catalyst. | | |

Figure 8:
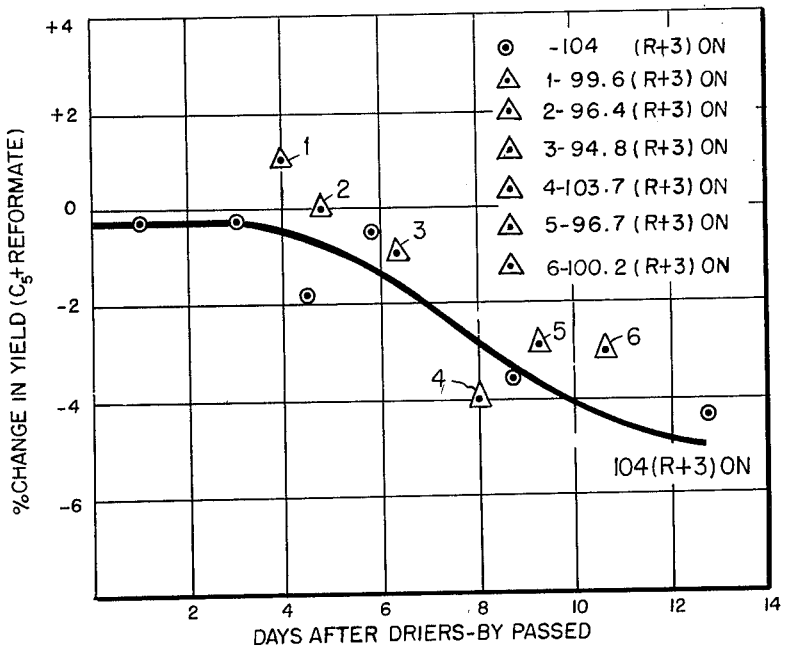

Illustrative of the effect of moisture in the recycle gas are the results graphically presented in FIGURE 8. A $C_5$ to 270° F. E.P. fraction of Mid-Continent naphtha was reformed in the presence of platinum-group metal reforming catalyst comprising 0.6 percent by weight of platinum and 0.7 percent by weight of chlorine on a support comprising alumina at a reactor pressure of 175 p.s.i.g. and a liquid hourly space velocity of 1 to produce leaded gasolines having the octane ratings indicated on the graph. In the first stage the recycle gas was dried to a moisture content of about 1 p.p.m. by volume (.01 mm. Hg partial pressure of water). In the second stage the recycle gas was not dried and contained an average of about 17.5 p.p.m. of water (.2 mm. Hg partial pressure of water). The loss in yield at various octane levels (severi-

TABLE IX

| Run No | | 1 | | 2 | |
|---|---|---|---|---|---|
| Drying temperature, ° F | None (Fresh catalyst). | 450 and 950 | | 80 to 1,000 | |
| | | | Percent surface area retained | | Percent surface area retained |
| Location of catalyst in reactor: | | | | | |
| Top-Surface area, m.²/gm | 420–450 (Av. 45) | 392 | 90.1 | 392 | 90.1 |
| Middle-Surface area, m.²/gm | | 385 | 88.4 | 377 | 86.7 |
| Bottom-Surface area, m.²/gm | | 213 | 48.9 | 362 | 83.3 |
| Top-Crushing strength, pounds | 9.5–13 (Av. 11.3) | 7.2 | | 11.0 | |
| Middle-Crushing strength, pounds | | 5.8 | | | |
| Bottom-Crushing strength, pounds | | 7.2 | | | |

Conditions:
   Run No. 1: 300 to 450 volumes of hydrogen per hour per volume of catalyst for two hours at 450° F., followed by 300 to 450 volumes of hydrogen per hour per volume of catalyst at 950° F. for three hours.
   Run No. 2: 700 to 1.500 volumes of hydrogen per hour per volume of catalyst for 8 to 30 hours at each of the following temperatures: 80° F., 200° F., 450° F., 700° F., 800° F., 900° F., 1,000° F.

It will be observed that when the fresh catalyst was dried with a relatively small volume of gas and the temperature of the catalyst raised at a relatively rapid rate the surface area of the catalyst in the bottom of the reactor was reduced by about 51 percent. On the other ties) due to the increasing amount of water in the recycle gas is plotted against the time in days required for the wet recycle gas to affect the yields. [Negative change in yield in $C_{5+}$ reformate = (yield without driers)].

The effect of the moisture content of the recycle gas upon the yield of leaded gasoline having an octane rating of 110 is graphically illustrated in FIGURES 2A and 2B. The charge stock was the $C_6$ to 250° F. E.P. fraction of Mid-Continent naphtha dried to a moisture content of 15 p.p.m. by weight. As the moisture content of the recycle gas during a period of about six days decreased from 550 p.p.m. by volume to 150 p.p.m. by volume the yield of $C_{5+}$ reformate increased from 59 percent by volume to 65 percent by volume. In other words, had the moisture content of the recycle gas been 150 p.p.m. by volume (1.7 mm. Hg partial pressure of water) initially, the income from a 10,000 barrel a day unit would have been increased $9,000 when producing leaded gasoline having an octane rating of 110.

Thus, all of the data presented hereinbefore clearly establishes that when a naphtha is reformed in the presence of a platinum-group metal reforming catalyst and hydrogen under a total reactor pressure not exceeding 400 p.s.i.g., and preferably not exceeding 200 p.s.i.g., an industrially important increase in yield of the reformate can be obtained by operating under conditions of a reactor pressure of 200 p.s.i.g. such that the vapors in the reforming reaction zone have a partial pressure of water within the range of 0.10 to 0.20 millimeter of mercury as measured at the vapor outlet of the reforming reaction zone.

Presently, it is preferred to treat all three sources of water to reduce each to a presently practical minimum required for the limiting partial pressure of water in the reaction zone vapors. Thus, the charge naphtha can be dried, if necessary, by means of percolation through salt, contact with solid drying agents such as alumina, molecular sieves, or by distillation, to a water content of less than about 10 to 15 p.p.m. by weight. The recycle gas is separated from the $C_5$ and heavier reformate and the cooled gas, when containing more than one to five p.p.m. of water at 200 p.s.i.g., i.e., when having a partial pressure of water in excess of .01 to .06 mm. Hg, is dried in any conventional manner as by contact with molecular sieve material [Barrer U.S. Patent No. 2,306,610 issued Dec. 29, 1942, Linde Air Products, Co., July 1956, General Information on Linde Molecular Sieves Types 4 A. and 5 A. and Linde Molecular Sieves for Selective Adsorption, March 1956], alumina and the like to a moisture content of not more than 1 p.p.m. by volume at 200 p.s.i.g., i.e., a partial pressure of water of not more than .01 mm. Hg at a total pressure of 200 p.s.i.g.

Presently, it is preferred to dry, i.e., condition, fresh catalyst by exposing the unconditioned catalyst to 400 volumes per hour of hydrogen per volume of catalyst to 450° F. until the partial pressure of water in the exit gas from the reaction zone is not greater than about 20 mm. Hg. (The hydrogen entering the reaction zone preferably is dried when necessary to about 1 p.p.m. of water.) When the partial pressure of water in the exit gas from the reaction zone (Point A, FIGURE 1) does not exceed 20 mm. Hg the temperature of the gas and concomitantly the temperature of the catalyst bed is raised to 700° F. The temperature is maintained at 700° F. until the partial pressure of water in the exit gas from the reaction zone (Point A, in FIGURE 1) does not exceed 5 mm. Hg. The temperature of the gas is then raised to 900° F. and held at 900° F. until the partial pressure of water in the exit gas from the reaction zone (Point A, FIGURE 1) does not exceed 1 mm. Hg. In general, after the catalyst has been subjected to the foregoing dehydrating or desiccating treatment the moisture content of the catalyst is low enough that desiccated reforming at 200 p.s.i.g. can be performed when charging a feed naphtha containing not more than about 13 p.p.m. by weight of water and a recycle gas containing not more than 5 p.p.m. of water by volume, i.e., a partial pressure of water of less than 0.06 mm. Hg. However, when it is desirable or necessary the dehydrating or desiccating treatment can be continued at temperatures of 1000° F. when the partial pressure of water in the exit gas from the reaction zone is not in excess of 1 mm. Hg. However, even in the presence of desiccating inert gas having a partial pressure of water not in excess of 1 mm. Hg, the temperature of the catalyst is not raised above a temperature which is about 20° F. below the temperature at which the platinum-group metal catalyst is irreversibly deactivated.

While the method of dehydrating or desiccating fresh platinum-group metal reforming catalyst given in detail hereinbefore is presently the preferred method for preparing fresh platinum-group metal catalyst for use in reforming naphtha in low reactor pressures, there are many other combinations of time, temperature, and gas rate dependent upon the partial pressure of water in the dehydrating inert gas which can be used. The goal of all catalyst dehydrating treatments is to dehydrate the virgin catalyst to the condition in which after dehydration the partial pressure of water in the dehydrating inert gas when contacted with the desiccated catalyst at the rate of 24 to 240 s.c.f./min./bbl. is not in excess of 1 to 3 mm. Hg under conditions of temperature and partial pressure of water in the dehydrating inert gas (hereinafter designated dehydrating gas) that the surface area of the catalyst preferably is not substantially reduced and in general is not reduced to less than about 50 percent.

Yields of $C_{5+}$ reformate produced at pressures in excess of 400 p.s.i.g., from $C_{6+}$ naphtha having an end boiling point (E.B.P. or E.P.) within the range of 250° to 270° F. are also improved by dehydrating the platinum-group metal reforming catalyst to the extent described hereinbefore. Yields of $C_{5+}$ reformate produced at pressures from atmospheric to 1000 p.s.i.g. or more from the aforedescribed feeds are improved by dehydrating the platinum-group metal reforming catalyst to the extent described hereinbefore. Accordingly, the present invention provides a dehydrating procedure for virgin or regenerated platinum-group metal reforming catalyst for use in reforming at pressures from atmospheric to 1000 p.s.i.g. or more. It is to be noted that while the yield of $C_{5+}$ reformate having an octane rating of 109–111 (R+3 cc.) from $C_5$ to 380° F. E.B.P. naphtha is not improved when operating at pressures not exceeding 400 p.s.i.g. and when the partial pressure of water in the final effluent does not exceed 0.4 mm. Hg, nevertheless the on-stream time between regenerations is increased to practical and economically attractive extent.

In general, the dehydration of the platinum-group metal reforming catalyst is carried out by contacting the catalyst with an inert gas such as nitrogen, hydrogen, flue gas containing not more than fifty per cent of oxides of carbon and having a water content in excess of a partial pressure of 100 mm. Hg at temperatures below 700° F. The temperature of the dehydrating gas is increased incrementally as the partial pressure of water in the gas issuing from the reaction zone decreases. Thus, for example, the temperature of the dehydrating gas is maintained below 700° F. until the partial pressure of water in the gas issuing from the reaction zone is less than 100 mm. Hg, for example 50 mm. Hg. The temperature of the dehydrating gas is then raised to 750° F. and held at that temperature until the partial pressure of water in the reaction zone exit gas is less than 50 mm. Hg, for example 10 mm. Hg. The temperature of the dehydrating gas is then raised to 800° F. and held at that temperature until the partial pressure of water in the reaction zone exit gas is less than 10 mm. Hg, for example 5 mm. Hg. The temperature of the dehydrating gas is then raised to at least 900° F. but not greater than about 20° F. less than the heat damaging temperature, i.e., the temperature at which the catalyst is irreversibly deactivated by heat only. The temperature of the dehydrating gas is held at least at 900° F. until the partial pressure of water in the reaction zone exit gas is not more than 1 to 3 mm. Hg.

Reference is now made to FIGURE 1 wherein is illustrated in a diagrammatic manner a reforming unit for reforming naphtha at low reactor pressure, e.g., 200 p.s.i.g.

Reactors $R_1$, $R_2$ and $R_3$ are charged with the amount of virgin catalyst required to provide the liquid hourly space velocity necessary for the minimum vapor inlet temperature at which the charge naphtha can be reformed to provide a $C_{5+}$ reformate having the target leaded octane rating. Thus, for example, a unit to treat 10,000 barrels per day of naphtha at a liquid hourly space velocity of 1 is charged with a total of 51 tons of catalyst equivalent to 417 barrels of catalyst. With valve 2 in conduit 1 closed and valve 31 in conduit 23 closed, the unit is evacuated to about 25 inches of mercury vacuum. Inert gas, e.g., nitrogen, is introduced through conduit 27 (valve 32 open) into the unit to purge the remaining air therefrom through pipe 29. When the concentration of oxygen in the inert gas is not greater than about 1 percent the inert gas is displaced with hydrogen or hydrogen-containing gas. The hydrogen or hydrogen-containing gas is circulated by compressor 26 with valves 2 and 30 and 32 closed and valve 31 open. Presently, it is preferred to raise the temperature of the circulating hydrogen-containing gas, i.e., dehydrating gas, to about 450° F. and to circulate about $10^5$ to about $10^7$ s.c.f. of hydrogen per hour through the heaters and reactors, the separator, and the dryer. The temperature of the separator 21 is held at 70° F. or lower to reduce the load on the driers. The lower the temperature in the separator the more water is condensed and separated in separator 21 and the less water need be removed by the driers. It has been found that separator temperatures lower than about 70° F. operated in conjunction with fixed bed driers presently are preferred. Thus, in general, the present method of conditioning platinum-group metal reforming catalysts and particularly platinum-group metal catalyst having an alumina support provides for dehydrating the catalyst at temperatures dependent upon the partial pressure of water in the dehydrating gas at the vapor outlet of the reaction zone to ensure a minimum reduction in the surface area of the catalyst. Dehydration of the catalyst in the presence of the dehydrating gas is continued until the partial pressure of water in the dehydrating gas at the vapor outlet of the reaction zone is not more than about 1 to 3 mm. Hg when contacting the catalyst being conditioned with dehydrating gas having a partial pressure of water not in excess of 0.06 mm. Hg at the rate of $10^4$ to $10^5$ s.c.f. of said dehydrating gas per hour per ton of catalyst equivalent to 24–240 s.c.f. of said dehydrating gas per minute per barrel of catalyst (s.c.f. gas/min./bbl.).

Illustrative of the advantages accruing from dehydrating or desiccating platinum-group metal reforming catalyst in the manner described hereinbefore and reforming naphtha, particularly the $C_6$ to 250° F. E.P. fraction of naphtha, at low pressures of atmospheric to 400 p.s.i.g., preferably 100 to 300 p.s.i.g., under desiccated conditions is the following log of such an operation through an initial on-stream period, a regeneration, and a second on-stream period during which one-stream periods leaded $C_{5+}$ reformates having an octane rating of 109 to 112 were produced. Each of the two on-stream periods were of about three months' duration.

Feed, $C_6$ to 250° F. E.P. fraction of Mid-Continent naphtha:

| | Percent by volume |
|---|---|
| Paraffins | 51.2 |
| Olefins | 0 |
| Naphthenes | 45.7 |
| Aromatics | 3.1 |
| | 100.0 |

Catalyst, Virgin:

| | Percent by weight |
|---|---|
| Platinum | 0.61 |
| Chlorine | 0.7 |

Support: Alumina.
Catalyst conditioning treatment,
Dehydrating gas: Hydrogen.

| Temperature ° F. | Rate of Flow +s.c.f. gas/ Hour/BC* | Time, Hours |
|---|---|---|
| 450 | 1,590–2,855 | 2 |
| 950 | 1,590–2,855 | 2 |
| 960 | 17,000–26,000 | 3 |

+S.c.f. gas=Standard Cubic Feet of Dehydrating Gas.
*=Barrel of Catalyst.

Reaction zone: Moisture content, mm. Hg.
- Feed Naphtha (15 weight p.p.m. $H_2O$) _____ 0.8
- Recycle Gas:
  - (1 p.p.m. vol.) _____ 0.1
  - (10 p.p.m. vol′) _____ .11
- Conditioned catalysts °F. _____ <3 mm. @__ 900
- Reaction zone pressure, p.s.i.g. _____ 200

REFORMING CONDITIONS

| Time On-Stream, Days | Vapor Inlet Temp., °F. | Liquid Hourly, Space Velocity | Partial Pressure of Water Undried Recycle Gas mm. Hg Gas | Octane Rating R–3 cc. TEL |
|---|---|---|---|---|
| 0 | 960 | 0.8 | | |
| 1 | 960 | 0.8 | | 111.7 |
| 10 | 960 | 0.8 | 22 | 111.0 |
| 30 | 960 | 0.8 | ¹ 38 | 110.5 |
| 60 | 960 | 0.8 | ² 37 | 109.2 |
| 90 | 980 | 0.8 | | 109.2 |

REGENERATED

| | | | | |
|---|---|---|---|---|
| 0 | 960 | 0.8 | | |
| 1 | 960 | 0.8 | 150 | 112.4 |
| 10 | 960 | 0.8 | 30 | 111.4 |
| 30 | 960 | 0.8 | 22 | 110.8 |
| 60 | 960 | 0.8 | 19 | 109.3 |
| 90 | 975 | 0.8 | | 109.2 |

¹ Slug of water at 29 days.   ² Slug of water at 53 days.

Thus, it is manifest that the present invention provides a novel method of conditioning virgin or aged and regenerated platinum-group metal reforming catalyst wherein the platinum-group metal reforming catalyst, and particularly virgin platinum-group metal reforming catalyst in a reaction zone is contacted with dehydrating gas, preferably hydrogen or hydrogen-containing gas comprising at least 50 percent by volume of hydrogen and the balance to make 100 percent $C_1$ to $C_4$ hydrocarbons, at elevated temperatures not in excess of about 1000° F. dependent upon the partial pressure of water in the vaporous effluent of the reaction zone; wherein dehydrating conditions of temperature and partial pressure of water in said reaction zone effluent gas are regulated to reduce the loss in surface area of said reforming catalyst to a minimum not more than 50 percent of the surface area of a platinum-group metal reforming catalyst having a surface area of 400 or more square meters per gram (m.²/gm.) and preferably wherein said dehydrating conditions are regulated to maintain the surface area substantially constant; wherein the conditioned platinum-group metal reforming catalyst contains not more than 1.1 percent by weight of water based upon the weight of the catalyst after ignition at 1250° C. or when contacted with said dehydrating gas at 950° F. at the rate of 24–240 s.c.f./min./bbl. of catalyst the partial pressure of water in the gas leaving the catalyst is not more than 1 to 3 mm. Hg. The present invention also provides a method of desiccated reforming wherein a charge naphtha containing not more than innocuous amounts of sulfur, nitrogen, arsenic, and lead is contacted with particle-form solid platinum-group metal reforming catalyst in a reaction zone comprising one or more chambers or reactors at pressures of 50 to 400 p.s.i.g., preferably 150 to 300 p.s.i.g., at temperatures of at least 900° F. but not more than 20° F. below the catalyst deactivating temperature, at liquid hourly space velocities required to produce 10 R.V.P. leaded gasoline having octane ratings of at least 90 and preferably at least 100, and in the presence of not more than 0.4, preferably 0.1 to 0.2 mm. Hg partial pressure of water measured in the vaporous effluent of the reaction zone.

Thus, as illustrated by the flow sheet in FIGURE 1, reactors 7, 12, and 17 are charged with a particle-form, solid, platinum-group metal reforming catalyst comprising, for example, about 0.6 percent by weight of platinum and about 0.7 percent by weight of chlorine on a support comprising alumina. The concentration of platinum-group metal is within the limits of 0.1 to about 2 percent by weight or more. The concentration of chlorine and/or fluorine is within the limits of 0.1 to about 0.8 percent by weight. The alumina can contain up to 45 percent by weight of silica and is conventional. The system is exhausted to about 25 inches of mercury vacuum and purged with an inert gas such as nitrogen or flue gas until the concentration of oxygen in the effluent gas from reactor 17 is not greater than about 1 percent. After the unit has been purged of air, valve 30 is closed and valve 31 opened. Dehydrating gas, e.g., flue gas containing not more than 50 percent oxides of carbon, nitrogen, hydrogen, or a mixture of hydrogen and $C_1$ to $C_4$ hydrocarbons containing at least 50 percent by volume of hydrogen is introduced into the unit through pipe 27. When the pressure in the unit is about 25 to 200 p.s.i.g. valve 32 is closed and the dehydrating gas is circulated by means of compressor 26. The coolant, usually water, is introduced into cooler 19 at a temperature and in volume sufficient to cool the circulating dehydrating gas to at least 70° F. The partially dried dehydrating gas is contacted with sufficient solid absorbent such as 4 to 5 Angstrom molecular sieve material, alumina or other desiccant to reduce the moisture content of the partially dried circulating dehydrating gas to a concentration such that the partial pressure of water in the dehydrating gas is not greater than about .01–.06 mm. Hg.

The circulating dehydrating gas is heated to 450° F. in heaters 5, 10 and 15 and the temperature maintained below about 700° F. until the partial pressure of water in the effluent from reactor 17 is not greater than about 100 mm. Hg. The temperature of the dehydrating gas is then raised to about 700° to about 725° F. until the partial pressure of water in the effluent from reaction 17 is not greater than about 35 mm. Hg. The temperature of the dehydrating gas is then raised to about 800° F. to about 825° F. and maintained in that range until the partial pressure of water in the effluent from reactor 17 is not greater than about 10 mm. Hg. The temperature of the dehydrating gas is then raised to about 950° F. and maintained at that level until the partial pressure of water in the effluent from reactor 17 is not more than 1 to 3 mm. Hg. During the foregoing desiccation of the catalyst the dehydrating gas is circulated through the reactors at the rate of about 24 to about 240 s.c.f./min./bbl. of catalyst. During this latter period of conditioning the partial pressure of water in the circulating dehydrating gas leaving drier 24 is not greater than 0.06 mm. Hg. Alternatively, when the partial pressure of water in the effluent from reactor 17 is less than 100 mm. Hg the temperature of the dehydrating gas can be raised incrementally from 700°–725° F. as the partial pressure of water in the aforesaid effluent decreases at the rate of about 1.5° to about 1.8° F. per mm. Hg decrease in the partial pressure of water in the aforesaid effluent.

The catalyst has now been conditioned for desiccated reforming when the concentration of water in the feed naphtha does not exceed 15 p.p.m. by weight and the concentartion of water in the recycle gas is not greater than one p.p.m. at 200 p.s.i.g. (In other words, the water in the reactors 7, 12, and 17 derived from the catalyst, the feed naphtha, and the recycle gas is not more than 0.4 mm. Hg and preferably within the limits of 0.10 to 0.2 mm. Hg as measured at "A" in the effluent line of reactor 17.) At this time, when the dehydrating gas is not hydrogen or the aforesaid hydrogen-containing gas the dehydrating gas is displaced with hydrogen or hydrogen-containing gas as aforedescribed in which the partial pressure of water is not greater than in the dehydrating gas issuing from drier 24 and the pressure in the system raised to operating pressure, in this illustrative example less than 400 p.s.i.g., for example, 200 p.s.i.g. Concomitant with the displacement of a major portion or all of the dehydrating gas other than hydrogen or hydrogen-containing gas the temperature at the vapor inlets of reactors 7, 12, and 17, if necessary, are lowered to operating temperatures and feed naphtha pumped from a source not shown by a pump not shown is introduced through pipe 1 (valve 2 open) into pipe 3 where the feed naphtha mixes with the circulating gas to form a charge mixture in which the hydrogen-to-naphtha mol ratio is about 0.5:1 to 25:1 and preferably about 3:1 to 10:1.

The charge mixture is heated to reforming reaction temperature in coil 4 in furnace 5 and flows through pipe 6 to reactor 7. The charge mixture flows downwardly through reactor 7 to the vapor outlet thereof and thence through pipe 8 to coil 9 in furnace 10 where the first reactor effluent is reheated to a reforming reaction temperature the same as, or higher or lower than, the reforming reaction temperature as measured at the vapor inlet to reactor 7. The reheated first reactor effluent flows through pipe 11 to reactor 12. The reheated first reactor effluent flows downwardly through reactor 12. The effluent therefrom, the second reactor effluent, flows from reactor 12 through pipe 13 to coil 14 in furnace 15. In coil 14 the second reactor effluent is reheated to a reforming reaction temperature the same as, higher or lower than the reforming reaction temperatures measured at the inlets of reactors 7 and 12.

The reheated second reactor effluent flows from coil 14 through pipe 16 to reactor 17. The reheated second reactor effluent flows downwardly through reactor 17. The effluent therefrom, the third reactor effluent, flows through pipe 18 to cooler 19.

In cooler 19 the third reactor effluent is cooled to a temperature at which water and $C_4$ and heavier hydrocarbons are condensed. Preferably, the third reactor effluent is cooled to about 70° F. to balance the load on the driers. The use of lower cooler temperatures is dependent upon local conditions but the reduced load on the driers usually does not compensate for the increased cost of cooling to appreciably lower temperatures. From cooler 19 the cooled third reactor effluent flows through pipe 20 to liquid-gas separator 21 where the $C_4$ and heavier hydrocarbons and water separate from the hydrogen and $C_1$ to $C_3$ hydrocarbons.

The $C_4$ and heavier hydrocarbons are withdrawn from separator 21 through pipe 22 to means for finishing the reformate such as stabilizing, fractionating, the addition of additives, etc. The water flows from separator 21 through pipe 28 to waste.

The hydrogen and $C_3$ and lighter hydrocarbons comprise the recycle gas. The recycle gas flows from separator 21 through conduit 23 to drier 24 (valve 31 open). When the volume of recycle gas is in excess of that required to maintain the hydrogen-to-naphtha mol ratio a portion of the recycle gas is bled off to other operations, refinery fuel gas main, or the like.

The partial pressure of water flowing from separator 21 at 70° F. usually is about 15 to 20 mm. Hg. Drier 24 is a plurality of driers some of which are on-stream and some of which are in the regeneration portion of the cycle. To reduce the partial pressure of water in the recycle gas from 20 to .01 mm. Hg requires contact with about 3 to 12 pounds of molecular sieve material (4 to 5 Angstroms) per 10,000 s.c.f. of recycle gas to be dried to a partial pressure of water of .01 mm. Hg. Accordingly, the recycle gas flows from conduit 23 and contacts about 3 to 12 pounds of molecular sieve desiccant per 10,000 s.c.f. of recycle gas. The desiccated recycle gas having a partial pressure of water of .01 to .06 mm. Hg flows from drier 24 through conduit 25 to the suction side of compressor 26. Compressor 26 recompresses the desiccated recycle gas to a pressure somewhat in excess of the pressure in reactor 7. The recompressed desiccated recycle gas flows through conduit 3 to coil 4 in heater 5. At some point in conduit 3 intermediate to compressor 26 and to coil 4 the feed naphtha is mixed with the desiccated recycle gas to form the aforesaid charge mixture. Alternatively, drier 24 can be downstream of compressor 26, i.e., intermediate to compressor 26 and furnace 5.

What is claimed is:

1. A method of conditioning particle-form solid platinum-group metal reforming catalyst which comprises contacting in a reaction zone unconditioned particle-form solid platinum-group metal reforming catalyst with dehydrating gas, regulating the temperature of said dehydrating gas to less than 700° F. when the partial pressure of water vapor in said dehydrating gas is in excess of 20 millimeters of mercury, raising the temperature of said dehydrating gas to 700° F. when the partial pressure of water vapor in said dehydrating gas is less than 20 but greater than 5 millimeters of mercury, raising the temperature of said dehydrating gas to 900° F. when the partial pressure of water vapor in said dehydrating gas does not exceed 5 millimeters of mercury, and maintaining said dehydrating gas at a temperature in the range of 900° to about 1000° F. until the partial pressure of water vapor in said dehydrating gas does not exceed 1 millimeter of mercury, all of said partial pressures of water vapor in said dehydrating gas being measured at the vapor outlet of said reaction zone.

2. The method of conditioning particle-form solid platinum-group metal reforming catalyst as set forth in claim 1, wherein the particle-form solid platinum-group metal reforming catalyst comprises about 0.1 to about 2.0 percent by weight of platinum and about 0.1 to about 0.8 percent by weight of chlorine on a support consisting essentially of alumina; wherein the surface area of the unconditioned particle-form solid platinum-group metal reforming catalyst is at least 350 square meters per gram, wherein said particle-form solid platinum-group metal reforming catalyst is contacted with hydrogen-containing dehydrating gas at a temperature of about 450° F., at a rate in the range of about 24 to about 240 s.c.f. of hydrogen per minute per barrel of catalyst, wherein when the partial pressure of water vapor in said dehydrating gas is less than 10 millimeters of mercury the temperature of said dehydrating gas is raised to at least 700° F., but not substantially in excess of 1000° F., and wherein a conditioned catalyst having a surface area of at least 300 square meters per gram is obtained.

3. The method of conditioning particle-form solid platinum-group metal reforming catalyst as set forth in claim 1, wherein the particle-form solid platinum-group metal reforming catalyst comprises about 0.1 to about 2.0 percent by weight of platinum and about 0.1 to about 0.8 percent by weight of chlorine on a support consisting essentially of alumina, wherein the surface area of the unconditioned particle-form solid platinum-group metal reforming catalyst is at least 350 square meters per gram, wherein said particle-form solid platinum-group metal reforming catalyst is contacted with hydrogen-containing dehydrating gas at a rate in the range of about 24 to about 240 s.c.f. of hydrogen per minute per barrel of catalyst at a temperature of about 450° F. for about two hours, wherein when the partial pressure of water vapor in said hydrogen-containing dehydrating gas is less than 10 millimeters of mercury said particle-form solid platinum-group metal reforming catalyst is contacted with said hydrogen-containing dehydrating gas at a rate in the range of about 24 to about 240 s.c.f. of hydrogen per minute per barrel for about three hours at a temperature of at least 950° F. and wherein a conditioned particle-form solid platinum-group metal reforming catalyst having a surface area of at least 300 square meters per gram is obtained.

4. A method of reforming naphtha which comprises charging a reaction zone with unconditioned particle-form solid platinum-group metal reforming catalyst, contacting said charged unconditioned particle-form solid platinum-group metal reforming catalyst with dehydrating gas, regulating the temperature of said dehydrating gas to less than 700° F. when the partial pressure of water vapor in said dehydrating gas is in excess of 20 millimeters of mercury, raising the temperature of said dehydrating gas to 700° F. when the partial pressure of water vapor in said dehydrating gas is less than 20 but greater than 5 millimeters of mercury, raising the temperature of said dehydrating gas to 900° F. when the partial pressure of water vapor in said dehydrating gas does not exceed 5 millimeters of mercury, and maintaining a temperature in the range of 900° F. to about 1000° F. until the partial pressure of water vapor in said dehydrating gas does not exceed 1 millimeter of mercury, all of said partial pressures of water vapor in said dehydrating gas being measured at the vapor outlet of said reaction zone, obtaining a conditioned particle-form solid platinum-group metal reforming catalyst, contacting said conditioned particle-form solid platinum-group metal reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the aforesaid reaction zone not in excess of 0.4 millimeter of mercury as measured at the vapor outlet of the aforesaid reaction zone, and recovering $C_5$ and heavier reformate having an octane rating appreciably in excess of the octane rating of the aforesaid charge naphtha.

5. A method of reforming naphtha which comprises charging a reaction zone with unconditioned particle-form solid platinum-group metal reforming catalyst comprising about 0.1 to about 2.0 percent by weight of platinum and about 0.1 to about 0.8 percent by weight of chlorine on a support consisting essentially of alumina and having a surface area of at least 350 square meters per gram, contacting said particle-form solid platinum-group metal reforming catalyst with hydrogen-containing dehydrating gas at a temperature of about 450° F. at a rate in the range of about 24 to about 240 s.c.f. of hydrogen per minute per barrel of catalyst, when the partial pressure of water vapor in said dehydrating gas is less than 10 millimeters of mercury raising the temperature of said dehydrating gas to at least 700° F. but not substantially in excess of 1000° F., said partial pressures of water vapor being measured at the vapor outlet of said reaction zone, obtaining a conditioned particle-form solid platinum-group metal reforming catalyst having a surface area of at least 300 square meters per gram, contacting said conditioned particle-form platinum-group metal reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the aforesaid reaction zone not in excess of 0.4 millimeter of mercury as measured at the vapor outlet of said reaction zone, and recovering $C_5$ and heavier reformate having an octane rating appreciably in excess of the octane rating of the aforesaid charge naphtha.

6. A method of reforming naphtha which comprises charging a reaction zone with unconditioned particle-form solid platinum-group metal reforming catalyst comprising about 0.35 to about 0.6 percent by weight of platinum and about 0.4 to about 0.7 percent by weight of chlorine on a support consisting essentially of alumina and having a surface area of at least 350 square meters per gram, contacting said unconditioned particle-form solid platinum-group metal reforming catalyst with hydrogen-containing dehydrating gas at a rate in the range of about 24 to about 240 s.c.f. of hydrogen per minute per barrel of catalyst at a temperature of about 450° F. for about two hours, when the partial pressure of water vapor in said hydrogen-containing dehydrating gas is less than 10 millimeters of mercury, contacting said particle-form solid platinum-group metal reforming catalyst at a rate in the range of about 24 to about 240 s.c.f. of hydrogen per minute per barrel for about three hours at a temperature of at least 950° F. but not substantially in excess of about 1000° F., obtaining a conditioned particle-form solid platinum-group metal reforming catalyst having a surface area of at least 300 square meters per gram, contacting said conditioned particle-form solid platinum-group metal reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the aforesaid reaction zone not in excess of 0.4 millimeter of mercury as measured at the vapor outlet of said reaction zone, and recovering $C_5$ and heavier reformate having an octane rating appreciably in excess of the octane rating of the aforesaid charge naphtha.

7. A method of reforming naphtha which comprises charging a reaction zone with unconditioned particle-form solid platinum-group metal reforming catalyst, contacting said charged unconditioned reforming catalyst with dehydrating gas consisting essentially of hydrogen, regulating the temperature and periodically increasing the temperature of the aforesaid dehydrating gas as the partial pressure of water in the effluent dehydrating gas decreases in accordance with the temperature-partial pressure relation defined by the area upward from the line representing an area of 200 square meters per gram in FIGURE 3A to maintain a surface area of at least 200 square meters per gram of the aforesaid reforming catalyst, obtaining a conditioned particle-form solid platinum-group metal reforming catalyst, contacting said conditioned reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the aforesaid reaction zone not in excess of 0.4 millimeter of mercury, and recovering $C_5$ and heavier reformate having an octane rating appreciably in excess of the octane rating of the aforesaid charge naphtha.

8. The method of reforming as set forth in claim 7 wherein the conditioned particle-form solid platinum-group metal reforming catalyst has a surface area of at least 300 square meters per gram.

9. A method of reforming naphtha which comprises charging a reaction zone with unconditioned eta-alumina base particle-form solid platinum-group metal reforming catalyst, contacting said charged unconditioned eta-base particle-form solid platinum-group metal reforming catalyst with dehydrating gas consisting essentially of hydrogen, incrementally increasing the temperature of the aforesaid dehydrating gas from about 700° to not more than about 1000° F. as the partial pressure of water in the effluent dehydrating gas decreases in accordance with the temperature-partial pressure relation defined by the area upward of line AB in FIGURE 5A to maintain a surface area of at least 200 square meters per gram of the aforesaid reforming catalyst, obtaining a conditioned eta-base particle-form solid platinum-group metal reforming catalyst, contacting said conditioned eta-base particle-form solid platinum-group metal reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the foresaid reaction zone not in excess of 0.4 millimeter of mercury, and recovering $C_5$ and heavier reformate having an octane rating appreciably in excess of the octane rating of the aforesaid charge naphtha.

10. The method of reforming naphtha as set forth in claim 9 wherein the partial pressure of water vapor in the reaction zone is in the range of 0.05 to 0.2 millimeter of mercury.

11. A method of reforming naphtha which comprises charging a reaction zone with unconditioned particle-form solid platinum-group metal reforming catalyst, contacting said charged unconditioned reforming catalyst with dehydrating gas consisting essentially of hydrogen, regulating the temperature and periodically increasing the temperature of the aforesaid dehydrating gas as the partial pressure of water in the effluent dehydrating gas decreases in accordance with the temperature-partial pressure relation defined by the area to the left of the curve bearing the legend, "200 m.$^2$/gm." in FIGURE 5B to maintain a surface area of at least 200 square meters per gram of the aforesaid reforming catalyst, obtaining a conditioned particle-form solid platinum-group metal reforming catalyst, contacting said conditioned reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the aforesaid reaction zone not in excess of 0.4 millimeter of mercury, and recovering $C_5$ and heavier reformate having an octane rating appreciably in excess of the octane rating of the aforesaid charge naphtha.

12. The method of reforming as set forth in claim 11 wherein the conditioned particle-form solid platinum-group metal reforming catalyst has a surface area of at least 300 square meters per gram.

13. A method of reforming naphtha which comprises charging a reaction zone with unconditioned particle-form solid platinum-group metal reforming catalyst, contacting said charged unconditioned reforming catalyst with dehydrating gas consisting essentially of hydrogen, regulating the temperature and periodically increasing the temperature of the aforesaid dehydrating gas as the partial pressure of water in the effluent dehydrating gas decreases in accordance with the temperature-partial pressure relation defined by the area upward of line CD in FIGURE 5A to maintain a surface area of at least 300 square meters per gram of the aforesaid reforming catalyst, obtaining a conditioned particle-form solid platinum-group metal reforming catalyst, contacting said conditioned reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the aforesaid reaction zone not in excess of 0.4 millimeter of mercury, and recovering $C_5$ and heavier reformate having an octane rating appreciably in excess of the octane rating of the aforesaid charge naphtha.

14. A method of reforming naphtha which comprises charging a reaction zone with unconditioned eta-alumina base particle-form solid platinum-group metal reforming, contacting said charged unconditioned eta-base particle-form solid platinum-group metal reforming catalyst with dehydrating gas consisting essentially of hydrogen, incrementally increasing the temperature of the aforesaid dehydrating gas from about 700° to not more than about 1000° F. as the partial pressure of water in the effluent dehydrating gas decreases in accordance with the temperature-partial pressure relation defined by the area upward of line CD in FIGURE 5A to maintain a surface area of at least 300 square meters per gram of the aforesaid reforming catalyst, obtaining a conditioned eta-based particle-form solid platinum-group metal reforming catalyst, contacting said conditioned eta-base particle-form solid platinum-group metal reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the aforesaid reaction zone not in excess of 0.4 millimeter of mercury, and recovering $C_5$ and heavier reformate having an octane rating appreciably in excess of the octane rating of the aforesaid charge naphtha.

15. A method of reforming naphtha which comprises charging a reaction zone with unconditioned eta-alumina base particle-form solid platinum-group metal reforming, contacting said charged unconditioned eta-base particle-form solid platinum-group metal reforming catalyst with dehydrating gas consisting essentially of hydrogen, incrementally increasing the temperature of the aforesaid dehydrating gas from about 700° to not more than about 1000° F. as the partial pressure of water in the effluent dehydrating gas decreases in accordance with the temperature-partial pressure relation defined by the area upward from the line representing an area of 200 square meters per gram in FIGURE 3A to maintain a surface area of at least 200 square meters per gram of the aforesaid reforming catalyst, obtaining a conditioned eta-base particle-form solid platinum-group metal reforming catalyst, contacting said conditioned eta-base particle-form solid platinum-group metal reforming catalyst in said reaction zone with charge naphtha in the presence of hydrogen-containing gas at reforming conditions of pressure, temperature, liquid hourly space velocity, and hydrogen-to-naphtha mol ratio, regulating the moisture content of said charge naphtha and said hydrogen-containing gas to maintain a partial pressure of water vapor in the aforesaid reaction zone not in excess of 0.4 millimeter of mercury, and recovering $C_5$ and heavier reformate having an octane rating appreciably in excess of the octane rating of the aforesaid charge naphtha.

References Cited by the Examiner

UNITED STATES PATENTS

| | | | |
|---|---|---|---|
| 2,698,305 | 12/1954 | Plank et al. | 252—455 |
| 2,943,044 | 6/1960 | Hindin | 208—138 |
| 2,952,611 | 9/1960 | Haxton et al. | 208—65 |
| 2,965,563 | 12/1960 | Steffgen et al. | 208—139 |
| 3,062,735 | 11/1962 | Donaldson et al. | 208—139 |
| 3,117,073 | 1/1964 | Hertwig et al. | 208—138 |

DELBERT E. GANTZ, *Primary Examiner.*

ALPHONSO D. SULLIVAN, PAUL M. COUGHLAN,
*Examiners.*

UNITED STATES PATENT OFFICE
CERTIFICATE OF CORRECTION

Patent No. 3,234,120            February 8, 1966

Leon M. Capsuto

It is hereby certified that error appears in the above numbered patent requiring correction and that the said Letters Patent should read as corrected below.

Column 3, line 2, after "revenue." strike out the closing parenthesis; column 10, line 38, for "125° C." read -- 1250° C. --; columns 11 and 12, TABLE IX, second column, line 2 thereof, for "(Av. 45)" read -- (Av. 435) --; column 15, line 56, for "one-stream" read -- on-stream --; column 16, line 13, before "Reaction zone" insert -- Source of water introduced into --.

Signed and sealed this 7th day of February 1967.

(SEAL)
Attest:

ERNEST W. SWIDER            EDWARD J. BRENNER

Attesting Officer            Commissioner of Patents